(12) United States Patent
Allen et al.

(10) Patent No.: US 10,366,707 B2
(45) Date of Patent: *Jul. 30, 2019

(54) PERFORMING COGNITIVE OPERATIONS BASED ON AN AGGREGATE USER MODEL OF PERSONALITY TRAITS OF USERS

(71) Applicant: International Business Machines Corporation, Armonk, NY (US)

(72) Inventors: Corville O. Allen, Morrisville, NC (US); Laura J. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/145,378

(22) Filed: Sep. 28, 2018

(65) Prior Publication Data
US 2019/0035421 A1 Jan. 31, 2019

Related U.S. Application Data

(63) Continuation of application No. 14/566,754, filed on Dec. 11, 2014, now Pat. No. 10,090,002.

(51) Int. Cl.
*G10L 25/63* (2013.01)
*G06F 17/27* (2006.01)
*G10L 15/18* (2013.01)

(52) U.S. Cl.
CPC .......... *G10L 25/63* (2013.01); *G06F 17/2765* (2013.01); *G06F 17/2785* (2013.01); *G10L 15/1822* (2013.01)

(58) Field of Classification Search
None
See application file for complete search history.

(56) References Cited

U.S. PATENT DOCUMENTS 5,790,124 A 8/1998 Fischer et al.
6,571,279 B1 5/2003 Herz et al.
(Continued)

FOREIGN PATENT DOCUMENTS

WO WO 02/09086 A1 1/2002

OTHER PUBLICATIONS

List of IBM Patents or Patent Applications Treated as Related (Appendix P), Sep. 26, 2018, 2 pages.
(Continued)

*Primary Examiner* — Thuykhanh Le
(74) *Attorney, Agent, or Firm* — Stephen R Tkacs; Stephen J. Walder, Jr.; Diana R. Gerhardt

(57) ABSTRACT

Mechanisms, in a natural language processing (NLP) system are provided. The NLP system receives a plurality of communications associated with a communication system, over a predetermined time period, from a plurality of end user devices. The NLP system identifies, for each communication in the plurality of communications, a user submitting the communication to thereby generate a set of users comprising a plurality of users associated with the plurality of communications. The NLP system retrieves a user model for each user in the set of users, which specifies at least one attribute of a corresponding user. The NLP system generates an aggregate user model that aggregates the at least one attribute of each user in the set of users together to generate an aggregate representation of the attributes of the plurality of users in the set of users. The NLP system performs a cognitive operation based on the aggregate user model.

23 Claims, 9 Drawing Sheets

(56) References Cited

U.S. PATENT DOCUMENTS

| | | | |
|---|---|---|---|
| 6,766,356 B1 | 7/2004 | Krautter | |
| 8,091,034 B2 | 1/2012 | Barbee et al. | |
| 8,120,655 B1 | 2/2012 | Molyneux | |
| 8,146,005 B2* | 3/2012 | Jones | G06T 13/40 704/258 |
| 8,478,114 B1 | 7/2013 | Beach et al. | |
| 8,527,588 B2 | 9/2013 | Beck et al. | |
| 8,682,972 B2 | 3/2014 | Salesky et al. | |
| 8,719,031 B2 | 5/2014 | Gibbon et al. | |
| 8,781,896 B2 | 7/2014 | LeBlanc et al. | |
| 8,854,531 B2 | 10/2014 | Karaoguz et al. | |
| 9,141,620 B2 | 9/2015 | Piccinini et al. | |
| 9,264,245 B2 | 2/2016 | Pasquero et al. | |
| 9,495,361 B2 | 11/2016 | Allen et al. | |
| 9,552,399 B1* | 1/2017 | Browning | G06Q 50/01 |
| 10,013,890 B2 | 7/2018 | Allen et al. | |
| 2002/0073417 A1 | 6/2002 | Kondo et al. | |
| 2002/0140724 A1 | 10/2002 | Qureshi et al. | |
| 2002/0141650 A1 | 10/2002 | Keeney et al. | |
| 2002/0177115 A1 | 11/2002 | Moskowitz et al. | |
| 2003/0033600 A1 | 2/2003 | Cliff et al. | |
| 2003/0227479 A1* | 12/2003 | Mizrahi | A63F 13/10 715/753 |
| 2007/0050191 A1* | 3/2007 | Weider | G10L 15/22 704/275 |
| 2007/0282912 A1 | 12/2007 | Reiner | |
| 2007/0282948 A1 | 12/2007 | Praino et al. | |
| 2008/0031433 A1 | 2/2008 | Sapp et al. | |
| 2008/0046910 A1 | 2/2008 | Schultz et al. | |
| 2008/0083003 A1 | 4/2008 | Biniak et al. | |
| 2008/0320082 A1 | 12/2008 | Kuhlke et al. | |
| 2009/0052645 A1* | 2/2009 | Bansal | H04L 12/1827 379/202.01 |
| 2009/0067349 A1 | 3/2009 | Glueckman et al. | |
| 2009/0138332 A1 | 5/2009 | Kanevsky et al. | |
| 2009/0143695 A1 | 6/2009 | Mullen et al. | |
| 2009/0150927 A1* | 6/2009 | Kouhi | H04N 7/173 725/34 |
| 2009/0210796 A1 | 8/2009 | Bhogal et al. | |
| 2009/0228937 A1 | 9/2009 | Williams | |
| 2009/0287678 A1 | 11/2009 | Brown et al. | |
| 2009/0325141 A1 | 12/2009 | Kelly et al. | |
| 2010/0122171 A1 | 5/2010 | Bauchot et al. | |
| 2010/0131082 A1* | 5/2010 | Chandler | G06F 17/18 700/30 |
| 2010/0332959 A1* | 12/2010 | Mitchell | G11B 27/034 715/202 |
| 2011/0047579 A1 | 2/2011 | Westbrook et al. | |
| 2011/0066587 A1 | 3/2011 | Ferrucci et al. | |
| 2011/0125734 A1 | 5/2011 | Duboue et al. | |
| 2011/0138479 A1 | 6/2011 | Jain et al. | |
| 2011/0231873 A1* | 9/2011 | Toebes | H04N 21/252 725/35 |
| 2011/0246574 A1* | 10/2011 | Lento | G06Q 10/10 709/204 |
| 2011/0295392 A1 | 12/2011 | Cunnington et al. | |
| 2012/0023046 A1* | 1/2012 | Verma | G06Q 30/02 706/12 |
| 2012/0066059 A1 | 3/2012 | Berger | |
| 2012/0159331 A1* | 6/2012 | Greve | H04L 67/22 715/730 |
| 2012/0159332 A1 | 6/2012 | Piccinini et al. | |
| 2012/0323674 A1 | 12/2012 | Simmons et al. | |
| 2013/0006686 A1* | 1/2013 | O'Sullivan | G06Q 10/06 705/7.13 |
| 2013/0007055 A1 | 1/2013 | Brown et al. | |
| 2013/0018652 A1 | 1/2013 | Ferrucci et al. | |
| 2013/0046796 A1* | 2/2013 | Hossain | H04L 67/306 707/803 |
| 2013/0066886 A1 | 3/2013 | Bagchi et al. | |
| 2013/0117672 A1* | 5/2013 | Coates | G06Q 10/10 715/730 |
| 2013/0144605 A1 | 6/2013 | Brager et al. | |
| 2013/0161381 A1* | 6/2013 | Roundtree | G06Q 30/0207 235/375 |
| 2013/0227420 A1 | 8/2013 | Pasquero et al. | |
| 2013/0325755 A1 | 12/2013 | Arquette et al. | |
| 2014/0010520 A1 | 1/2014 | Bhatia et al. | |
| 2014/0019542 A1* | 1/2014 | Rao | H04L 67/306 709/204 |
| 2014/0075385 A1* | 3/2014 | Wan | G06Q 10/1093 715/812 |
| 2014/0081767 A1 | 3/2014 | Zhang | |
| 2014/0122588 A1* | 5/2014 | Nimri | H04L 12/1831 709/204 |
| 2014/0136626 A1* | 5/2014 | Teevan | G06F 15/00 709/205 |
| 2014/0165087 A1* | 6/2014 | Smith | H04N 21/4758 725/24 |
| 2014/0172544 A1* | 6/2014 | Rabkin | G06Q 30/0245 705/14.44 |
| 2014/0172545 A1* | 6/2014 | Rabkin | G06Q 30/0269 705/14.44 |
| 2014/0176665 A1* | 6/2014 | Gottlieb | H04N 7/15 348/14.08 |
| 2014/0204234 A1 | 7/2014 | Nonaka et al. | |
| 2014/0214537 A1* | 7/2014 | Yoo | G06Q 30/0255 705/14.53 |
| 2014/0229866 A1* | 8/2014 | Gottlieb | H04L 65/403 715/758 |
| 2014/0244260 A1* | 8/2014 | Stewart | G10L 17/26 704/254 |
| 2014/0258503 A1* | 9/2014 | Tong | H04L 12/1827 709/224 |
| 2014/0280729 A1* | 9/2014 | Thomas | H04W 4/003 709/217 |
| 2014/0282013 A1* | 9/2014 | Amijee | G06F 16/4393 715/732 |
| 2014/0309987 A1 | 10/2014 | Maddali et al. | |
| 2015/0006286 A1 | 1/2015 | Liu et al. | |
| 2015/0006295 A1* | 1/2015 | Liu | G06Q 50/01 705/14.66 |
| 2015/0052440 A1 | 2/2015 | Livingston et al. | |
| 2015/0081734 A1* | 3/2015 | Mason | G06Q 10/10 707/772 |
| 2015/0094097 A1 | 4/2015 | Fraccaroli | |
| 2015/0142888 A1 | 5/2015 | Browning et al. | |
| 2015/0145648 A1* | 5/2015 | Winkelman | G07C 9/00309 340/5.72 |
| 2015/0193089 A1* | 7/2015 | Berlin | G06Q 10/10 715/731 |
| 2015/0222577 A1* | 8/2015 | Weir | H04L 12/1827 715/730 |
| 2015/0241436 A1* | 8/2015 | Santagata | G01N 33/5011 435/7.1 |
| 2015/0242751 A1 | 8/2015 | Zhang et al. | |
| 2015/0256351 A1 | 9/2015 | Murphy et al. | |
| 2015/0278837 A1* | 10/2015 | Lahav | G06Q 30/0204 705/7.33 |
| 2015/0302009 A1* | 10/2015 | Henderson | G06N 20/00 707/609 |
| 2015/0370787 A1* | 12/2015 | Akbacak | G06F 17/2836 704/2 |
| 2015/0372808 A1* | 12/2015 | Bilogrevic | G06N 7/005 380/279 |
| 2016/0011729 A1 | 1/2016 | Flores et al. | |
| 2016/0026918 A1 | 1/2016 | Barbieri et al. | |
| 2016/0042249 A1* | 2/2016 | Babenko | G06K 9/00744 382/170 |
| 2016/0063874 A1 | 3/2016 | Czerwinski et al. | |
| 2016/0125314 A1 | 5/2016 | Mulukutla et al. | |
| 2016/0140519 A1* | 5/2016 | Trepca | G06Q 20/12 705/26.44 |
| 2016/0150260 A1 | 5/2016 | Ovide | |
| 2016/0170938 A1 | 6/2016 | Allen et al. | |

(56) References Cited

U.S. PATENT DOCUMENTS

2016/0170956 A1 6/2016 Allen et al.
2016/0170967 A1 6/2016 Allen et al.

OTHER PUBLICATIONS

"Cognitive Computing", IBM Corporation, IBM Research, //www.research.ibm.com/cognitive-computing/index.shtml, accessed on Dec. 8, 2014, 2 pages.
"Cognitive Environments, A Symbiotic Cognitive Experience", IBM Corporation, http://researcher.ibm.com/researcher/view_group.php?id=5417, accessed on Dec. 8, 2014, 3 pages.
"IBM Watson Developer Cloud", IBM Corporation, Watson Services, www.ibm.com/smarterplanet/us/en/ibmwatson/developercloud/services-catalog html, accessed on Dec. 8, 2014, 2 pages.
"Question Answering", Wikipedia, accessed on Nov. 21, 2014, 9 pages.
"The Watson Ecosystem", IBM Corporation, www.ibm.com/smarterplanet/us/en/ibmwatson/ecosystem.html, accessed on Dec. 8, 2014, 7 pages.
Dong, Tiansi et al., "A Natural Language Question Answering System as a Participant in Human Q&A Portals", Proceedings of the Twenty-Second International Joint Conference on Artificial Intelligence, Jul. 16-22, 2011, pp. 2430-2435.
Harpaz, Yehouda , "The Mechanisms of Human Cognition", http://human-brain.org/cognition.html, Sep. 9, 1994, 48 pages.
High, Rob , "The Era of Cognitive Systems: An Inside Look at IBM Watson and How it Works", IBM Corporation, Redbooks, Dec. 12, 2012, 16 pages.
McCord, M.C. et al., "Deep parsing in Watson", IBM J. Res. & Dev. vol. 56 No. 3/4 Paper 3, May/Jul. 2012, pp. 3:1-3:15.
Popkin, Jamie, "Google, Apple Sin and IBM Watson: The Future of Natural-Language Question Answering in Your Enterprise", Gartner.com, https://www.gartner.com/doc/2534823/google-apple-siri-ibm-watson, Jun. 28, 2013, 2 pages.
Srihari, Rohini et al., "A Question Answering System Supported by Information Extraction", ANLC '00 Proceedings of the sixth conference on Applied natural language processing, http://www.aclweb.org/anthology/A00-1023.pdf, Apr. 29, 2000, pp. 166-172.
Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner

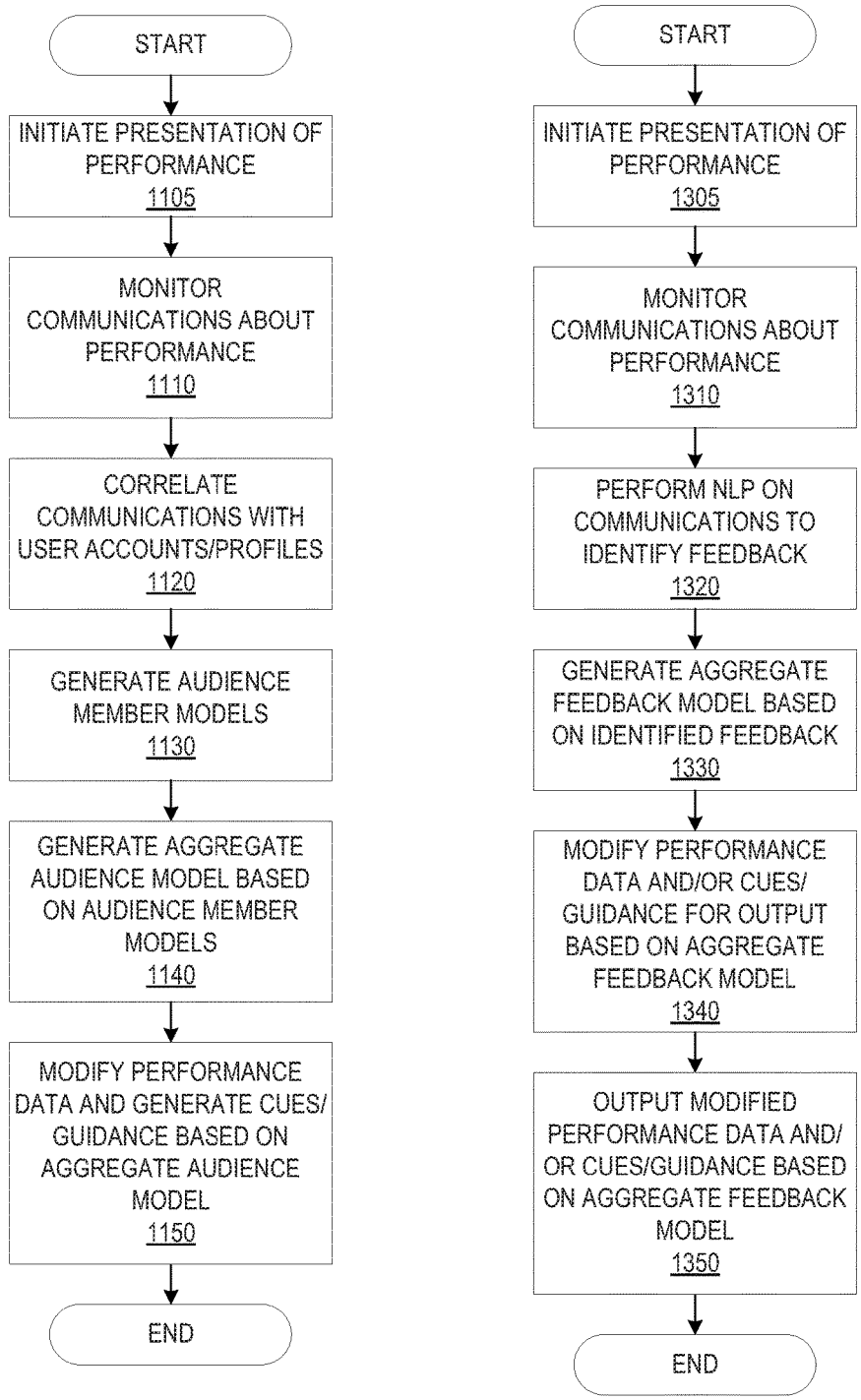

PERFORMING COGNITIVE OPERATIONS BASED ON AN AGGREGATE USER MODEL OF PERSONALITY TRAITS OF USERS

BACKGROUND

The present application relates generally to an improved data processing apparatus and method and more specifically to mechanisms for performing cognitive operations based on an aggregate user model of personality traits of users.

Currently, audience feedback metering is often used for evaluating speeches, seminar presentations or contestants' performances in song, dance and sports competitions. In these situations, the goal is to evaluate the presenter for their presentation, speech, singing/dancing or some other ability. Another popular example is political debates where such audience feedback metering used to measure an audience's live reaction to a candidate's speech. These solutions normally require extensive set up that may include creating a live web-based polling system or a telephone line bank for telephone-based polling or using individual hardware devices that are provided to a panel of people who can enter their feedback into the devices for subsequent measurement. Because of effort involved, these solutions are used during specific events for which they are specifically designed a priori. Moreover, they require a separate feedback metering mechanism with which the audience members must interact in order to specifically provide feedback.

There also exist webcast or web-seminar software systems that utilize instant polling mechanisms to gauge audience feedback. These solutions require the webcast or web-seminar moderator to take specific actions to set up the questions of the poll and to actively solicit feedback. Moreover, these again require that the audience member specifically interact with the polling mechanism to provide feedback and thus, rely on the audience member's willingness and desire to provide such feedback. These kinds of feedback systems enable a moderator to get feedback at specific times in a survey format but do not provide real-time live reaction measurement capability.

Further, many businesses are adopting telecommuting in the workplace. With an increase in telecommuting, traditional meetings that took place in a conference room are being replaced by telephone conferences. In telephone conferences, participants located at various locations dial into a "conference call." Using a telephone as a communications medium restricts information transfer to only verbal communication. Sometimes the telephone conferences are supplemented by instant message conferences or web conferences so that the participants can share presentations or exchange text messages with each other. One of the drawbacks of teleconferences is the attenuation of immediate feedback from participants. It is difficult for a meeting moderator to determine if participants are reacting favorably to the current topic of discussion. In the absence of visual cues such as body language and facial expressions, the meeting moderator is also unable to determine the interest level of the participants. In many cases, the meeting moderator has to specifically solicit participants for feedback such as asking questions to gauge if the participants agree with the current direction the meeting is headed. In other cases, the moderators have to use their own judgment to direct the meeting which may add the risk of alienating participants.

Commonly assigned U.S. Patent Application Publication No. 2009/0052645, entitled "Teleconference System with Participant Feedback," filed Feb. 26, 2009 teaches a mechanism for obtaining live feedback from an audience of a teleconference with instant messaging so as to let the moderator know their valuation of the current discussion. Based on the feedback, the moderator can take appropriate action, such as steer the conversation into areas that will be received favorably by the meeting participants.

SUMMARY

In one illustrative embodiment, a method, in a natural language processing (NLP) system comprising a processor and a memory is provided. The method comprises receiving, by the NLP system, a plurality of communications associated with a communication system, over a predetermined time period, from a plurality of end user devices. The method further comprises identifying, by the NLP system, for each communication in the plurality of communications, a user submitting the communication to thereby generate a set of users comprising a plurality of users associated with the plurality of communications. Moreover, the method comprises retrieving, by the NLP system, a user model for each user in the set of users. The user model specifies at least one attribute of a corresponding user. In addition, the method comprises generating, by the NLP system, an aggregate user model that aggregates the at least one attribute of each user in the set of users together to generate an aggregate representation of the attributes of the plurality of users in the set of users. Furthermore, the method comprises performing, by the NLP system, a cognitive operation based on the aggregate user model.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 11 is a flowchart outlining an example operation for performing real-time dynamic modification of a performance based on an aggregate audience model in accordance with one illustrative embodiment;

FIG. 13 is a flowchart outlining an example operation for analyzing audience messages to determine audience feedback in accordance with one illustrative embodiment.

Figure 1:
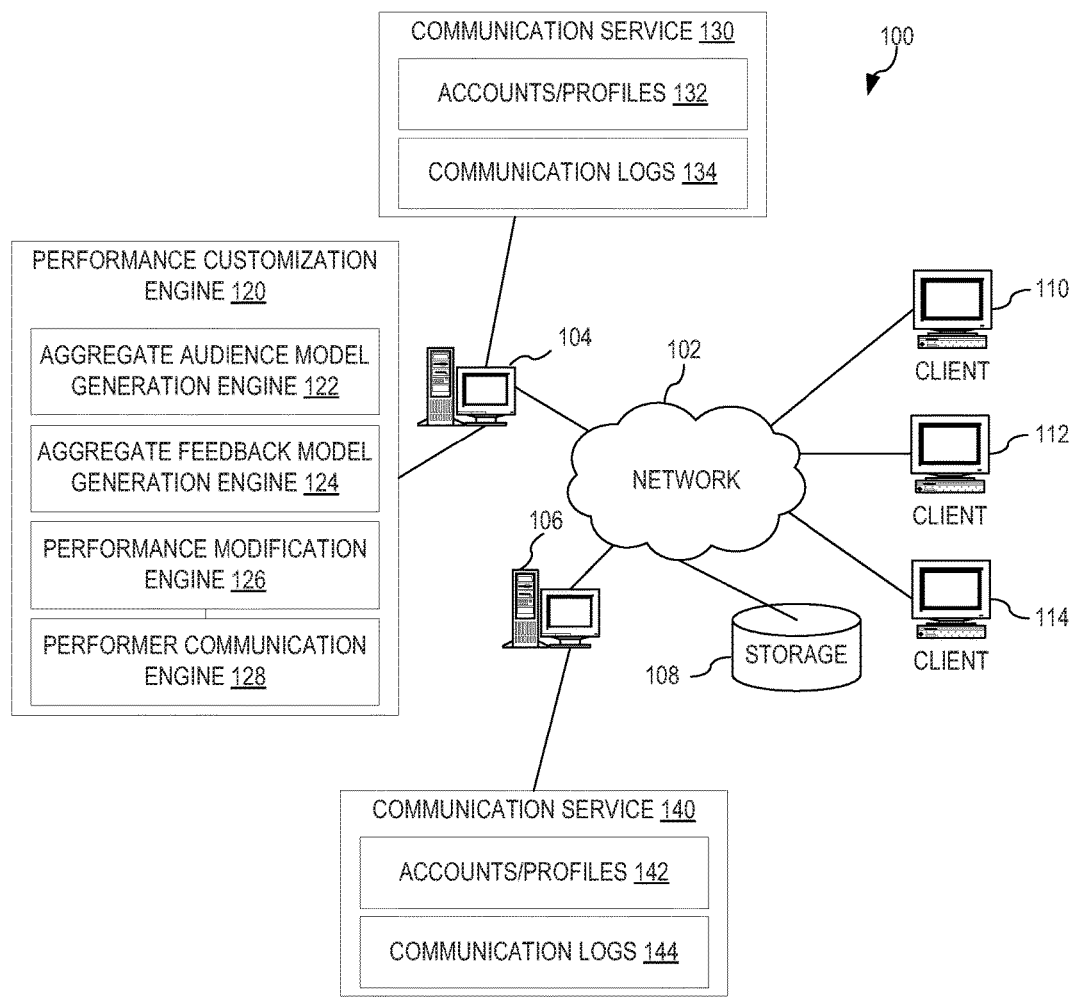
FIG. 1 is an example diagram of a distributed data processing system in which aspects of the illustrative embodiments may be implemented.

Appendix A is an example of a personality trait tree illustrating the relationship between personality traits and sub-traits as a nested tree structure where sub-traits are children of personality traits and sub-traits may have additional children sub-traits.

DETAILED DESCRIPTION

The illustrative embodiments provide mechanisms for modifying a performance to be presented to an audience based on an aggregation of personality traits of members of an audience and the feedback provided via multiple communication channels. It should be appreciated that while the primary illustrative embodiments will be described in the context of the modification of a performance based on aggregate audience personality traits and audience feedback, other illustrative embodiments are provided in which an aggregate user model representing the aggregate personality traits of a plurality of individuals is generated and used to perform a cognitive operation by a cognitive system. The following description will utilize the application of this aggregation of personality traits of individuals to the presentation of a performance, but is not limited to such as will be discussed again hereafter.

In accordance with some illustrative embodiments, the mechanisms of these illustrative embodiments leverage the facilities of audience member profiles, specifically obtained for the particular performance or obtained through other already existing computer systems, and network based communication mechanisms, to generate an aggregate audience model that represents an aggregate of the personality traits of the members of an audience of a performance. This may be done prior to the performance such that the performance may be tailored or customized for the particular audience based on the aggregate audience model. This may also be done in real-time while the performance is being performed such that cues and modifications to the performance may be made in real-time. Furthermore, audience member feedback messages may be automatically captured and analyzed using Natural Language Processing (NLP) mechanisms to generate an aggregate representation of the audience member feedback in a dynamic manner.

The audience member profiles may be specifically generated for the particular performance, may be obtained from other sources of services, or may be a compilation of profiles obtained from various sources. That is, in one illustrative embodiment, when a performance audience member signs up for, or otherwise indicates that they will attend a performance, information is gathered from the performance audience member indicating either explicitly one or more personality traits of the audience member, or other information from which a personality trait or traits may be determined. This may be done, for example, when the performance audience member creates an account or profile with the provider of the performance. For example, a person may establish an account/profile with a particular performance provider and, in the process, the person may provide information about himself/herself that is indicative of the person's personality trait. This information may be of various types including the person's occupation, hobbies, age, gender, other types of performances they have attended, likes, dislikes, and the like. The person may further explicitly state what they believe are their personality traits.

This information may be analyzed through trained logic of the illustrative embodiments to identify the person's personality trait(s) and store an association of the personality trait(s) in a data structure representing the audience members' personality traits. Personality traits may comprise traits such as Introverted, Extroverted, Conscientious, Detail-oriented, Abstract Thinker, Big Picture Oriented personality, or any other classification of the personality of an individual. A single individual may have multiple personality traits. Each personality trait of an individual is indicative of the types of information and level of information that the individual tends to be interested in and which will resonate with that individual. For example, an introverted person, detail-oriented person, or conscientious person may be more interested in details and specifics of a particular topic, to varying degrees, whereas an extroverted, abstract thinker, or big picture oriented person may be more concerned with general concepts, information about persons and relationships, or the like, again at varying degrees. Thus, by knowing a person's personality trait(s), one can tailor or customize a performance so that it is more likely to resonate with that particular person.

In order to identify such personality trait(s), trained logic is provided for analyzing the performance audience member's account or profile characteristics to score the characteristics relative to a plurality of pre-defined personality trait(s). The trained logic may be part of a cognitive system in which aspects of the illustrative embodiments are implemented. An example of a cognitive system in which the illustrative embodiments may be implemented is the IBM Watson™ cognitive system available from International Business Machines (IBM) Corporation of Armonk, N.Y. As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like high accuracy at speeds far faster than human beings and on a larger scale. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situational awareness that mimic human cognition based on experiences
- Answer questions based on natural language and specific evidence With regard to identifying personality traits of an audience member, the trained logic of the illustrative embodiments within a cognitive system may operate on a set of pre-defined personality trait(s) with associated matching characteristics of audience member accounts/profiles, stored in a storage device associated with the trained logic of the cognitive system. The trained logic may evaluate the audience member's account/profile with the regard to characteristics in the account/profile that match the various personality trait(s). Personality trait(s) that are matched above a predetermined threshold number of times are considered to be representative of the audience member and thus, are established as personality trait for that audience member. These personality trait(s) for the audience member may be stored in association with an identifier of the audience member in association with an audience data structure.

In another illustrative embodiment, rather than specifically requesting information from the audience member in response to signing up of otherwise registering for inclusion as an audience member for a particular performance, the account/profile may be established with other service providers that may be searched to identify such accounts/profiles and then determine the personality trait(s) of the audience member. For example, in response to the audience member signing up for or otherwise registering for inclusion in the audience of a particular performance, the mechanisms of the illustrative embodiments may search well known websites and databases for user profiles or accounts associated with the audience member. These well known websites may be employer websites, social networking websites, discussion forums, instant messaging websites, or the like.

For example, if the performance is for a company meeting, the employment records for the company may be searched for an account/profile associated with the audience member. If the performance is for a professional organizations' annual meeting, then the accounts/profiles of members of the professional organization may be searched for matching accounts/profiles for the audience member. If the performance is not associated with a particular organization, then social networking websites may be searched for accounts/profiles associated with the audience member, e.g., Facebook®, Twitter®, Instagram®, Pinterest®, or the like. Accounts/profiles may be obtained based on an identifier of the audience member, e.g., an audience member's name, an employee identifier, electronic mail address, a system username, an organization member's membership number, or a combination of identifiers such as a member's name and address, or the like. Any unique identifier for an audience member may be used without departing from the spirit and scope of the illustrative embodiments. The profiles obtained from these various social networking websites, organization systems, or the like, are analyzed to identify the characteristics of the profiles and match them to characteristics associated with pre-defined personality traits in the manner described above to identify one or more personality traits associated with the audience member.

In still another illustrative embodiment, messages and/or other text authored by the audience member on one or more websites or in one or more documents of a corpus may be analyzed with Natural Language Processing (NLP) to identify key terms and/or phrases indicative of particular personality traits. For example, an audience member's postings on a social network may be analyzed to identify terms/phrases indicative of the types of terms/phrases that a person of a particular personality trait uses. Moreover, the postings may be further analyzed to identify areas of interest, interactions of the person with other individuals, events attended by the individual, or the like, that would be indicative of a particular personality trait. For example, a person that posts messages discussing how the person meets with friends in social settings, attends social events, is tagged in photos by other individuals, has a large following or listing of "friends", and the like, will be considered to be more of an extrovert and social person whereas a person that posts about book reading, television shows they watch, does not have postings about social events, and the like, may be more indicative of a person that is introverted and less socially minded. Various indicators of personality traits may be trained into the logic of the illustrative embodiments and used to evaluate the audience member's interactions with social networks and other online communication systems so as to build an idea of the personality trait(s) of the audience member. Of course, a combination of these various approaches for identifying personality traits of an audience member may be utilized as well.

Having generated the profiles of the audience members, an aggregate audience model may be generated based on the personality traits of the audience members. This aggregation may be generated in many different ways. For example, the aggregation may be a weighted aggregate of each of the personality traits of the various audience members. Thus, for example, percentages of the audience members being introverted, extroverted, conscientious, big-picture minded, abstract thinkers, and the like, may be generated. From this, a model of the audience may be generated that the audience is X % extroverts, Y % introverts, Z % abstract thinkers, Q % openness, R % conscientious, S % agreeableness, T % neuroticism, etc. Alternatively, a set of one or more non-contrary or mutually exclusive personality traits of the audience as a whole may be generated based on one or more calculations or formulae, e.g., the audience is introverted and abstract thinkers (the audience traits would not be introverted and extroverted since these are mutually exclusive). If the audience were considered to be two or more personality traits that are contrary to one another or mutually exclusive, then a personality trait having a highest number of audience members of that trait may be selected or logic may be provided for selecting one personality trait over the other. The IBM Watson™ cognitive system's service for generating User Models can be used to generate the personality traits for a single user. Information about the IBM Watson™ cognitive system's service for generating User Models may be obtained at the IBM Watson™ Developer Cloud documentation website.

In one embodiment, the generation of an aggregate model encompasses combining like personality traits that are within a standard deviation of the variance for each trait, or personality traits that are within a fixed range for a majority of the audience. Further, each personality trait can be weighted based on several methods to allow for meaningful aggregation of traits from particular users. For example, in one illustrative embodiment, a mean square weighted deviation may be used as personality traits shift among the brackets of percentages as discussed below. The weighting may be used to choose the top set or sets of personality traits to aggregate.

This aggregate may be taken over a period of time designated for observation, such as in the case of a dynamic performance or presentation, and may be continuously stored and calculated, for example every 5 minutes, depending on data frequency. Given a user model for each individual audience member, the matching personality traits across all individual audience members is found, for example openness, by taking the value given by the user model service for those traits. In one embodiment this is a percentage for the individual to be "open" or exhibit a personality trait of "openness."

Non-correlating values that are one standard deviation away may be dropped so as to focus on the most similar sets of personality traits across the audience over the specified period of time. Thereafter, the rest of the remaining values associated with personality traits may be summed to generate values indicative of an aggregation score for the personality traits of the audience. That is, for all the personality trait values, a standard deviation is calculated and a cluster of values that are in pre-defined brackets, e.g., A (zero to 25 percent), B (26 to 50 percent), C (51 to 75 percent), and D (75 to 100 percent) is determined with subsequent counting of the number of individuals in each bracket. The brackets with the top two most individuals may then be selected as a bracket for representing the aggregate audience. If the brackets are adjacent, e.g., A&B, or B&C, or C&D, then the values that are within these brackets are selected and the lowest and highest values that are one standard deviation away from the high and low values of the selected brackets are dropped. The personality trait values for the aggregate user model are summed. If the personality trait values are not adjacent (A&C, A&D, etc), then the standard deviation of the total number of individuals is calculated and the sum of individuals in each bracket, if the number of individuals is less than double of the other bracket, is calculated. Thereafter, the scores (sum) of all brackets are combined excluding the bottom or top scores of individuals within two standard deviations of the originally excluded brackets that are closest to the current brackets being used. For example, A&D brackets are found, with similar size (number of individual audience members present in the bracket), B is the closest to A and will have it's top scores within two standard deviation of the number of individuals excluded. The C bracket closest to D will have it's bottom scores within two standard deviation of the number of individuals excluded. The sum of the rest of the scores is the aggregate score. If the number of individuals is more than double the other bracket, then the aggregate score is the sum of the personality trait values for that bracket.

The aggregate audience model may be used to modify a performance and/or provide performers with cues as to modifications of the performer's performance that may be made to better resonate with the audience. For example, if the aggregate audience model indicates that the audience in general is extroverted and abstract-thinkers, then parts of the performance directed to more detail oriented individuals may be of less interest to the audience as a whole than other portions of the performance that are more geared to abstract thinkers and extroverted individuals. For example, slides in a slide deck that are directed to statistics or numerical representations of information may be less interesting or resonate less with the audience than a graphical representation of the same or similar information. Furthermore, anecdotes and example stories may be more interesting to the particular big-picture audience than to a conscientious audience that is more concerned with numbers, regulations, and the like.

Modification of the performance may take many different forms and may be done pre-performance or dynamically as the performance is being performed. For example, the aggregate audience model may be generated pre-performance and the personality traits of the aggregate audience model may be compared to personality trait tags associated with elements of the performance. For example, consider the performance to be a presentation at a conference where the presentation comprises slides and other visual/audio content. Each of the slides and other visual/audio content, if any, may be tagged by the creator of the presentation or other user with personality trait tags to indicate the personality traits with which the creator/user believes the slide content and/or other visual/audio content will resonate. Thus, for example, if a slide is directed to detailed numerical information, then a personality trait tag of "conscientious" and/or "introvert" may be associated with the slide while another slide directed to a general graph may be associated with a personality trait of "extrovert" or "big picture" or "abstract thinker" by assigning a corresponding personality trait tag. Of course, a default tag may also be utilized that identifies slides that must be present in the presentation regardless of other personality traits.

The aggregate audience model's personality traits may be compared against the personality traits of the various portions of the performance to identify which portions of the performance match a personality trait in the aggregate audience model. Those portions of the performance that match the personality traits may be identified to the presenter, performer, or creator of the performance so as to bring to their attention the portions of the performance that are most likely to be of interest to the audience or resonate more with the audience. The performance may then be modified by the presenter, performer, or creator to concentrate the performance on those portions that are identified as being of interest or resonating more with the personality traits of the aggregate audience model. For example, if the performance is a presentation, the slides and/or other visual/audio content may be selected for inclusion in the group of slides to be used to present information during the upcoming performance. If the performance is a play or other theatrical work, then scenes of the play or theatrical work may be selected for emphasis during the performance in some manner. If the performance is a musical performance, particular songs or musical works may be selected for inclusion in the musical performance. Any type of modification of a performance based on the tagging of portions of the performance with personality trait tags, or other types of metadata information, and the identification of an aggregate model of personality traits of the audience may be used without departing from the spirit and scope of the illustrative embodiments.

Using the slide presentation example above, this tagging (i.e. use of metadata indicators) of slides and/or other visual/audio content is especially useful in a situation where there may be multiple versions of slides for presenting the same information in different ways. That is, a presentation creator may generate two slides for representing the same information with one representation being determined by the creator to resonate more with detail oriented individuals while the other may be determined by the creator to resonate more with big picture or abstract thinker individuals. By tagging the slides accordingly with personality trait tags, and comparing these tags to the personality traits of the aggregate audience model, the presentation may be modified to adjust the presentation to the personality traits of the audience such that the presentation is more likely to be of interest or resonate with the audience.

This tagging of slides and/or other visual/audio content may also be used in situations where there are multiple branches of content that are possible to be presented. For example, a politician may create a speech with multiple possible points of interest to be presented in the speech and, depending upon the audience that the politician is speaking to, the speech may be modified by the mechanisms of the illustrative embodiments to adjust the speech to the particular personality traits of the audience. That is, portions of the speech in an electronic form may be tagged with personality traits and through a comparison of the personality traits of the aggregate audience model to the tags in the speech, the speech may be automatically or semi-automatically adjusted to include only those portions of the speech that match a personality trait of the aggregate audience model. Thus, if the politician's speech includes possible topics of interest of tax regulation, minimum wage increases, education funding, and international trade agreements, then if the politician is speaking in front of a teacher's union, the speech may be automatically adjusted to include the topics of minimum wage increases and education funding, whereas if the speech is being presented in front of a business owner's association, the speech may be automatically adjusted to include the topics of tax regulation and international trade agreements.

In some illustrative embodiments, rather than having to have the presenter, performer, creator, or the like, associate personality trait tags with portions of the performance, the association of the personality trait tags may be performed automatically by the mechanisms of the illustrative embodiments. For example, Natural Language Processing (NLP) may be performed on portions of text of the performance to identify key terms, phrases, concepts, or other content recognizable as being associated with particular personality traits. Corresponding personality trait tags may be associated with these portions of the performance automatically to thereby annotate the performance with these personality traits. Moreover, other analysis mechanisms may be employed to analyze other portions of visual/audio content in the performance, e.g., image analysis, audio analysis, or the like. In some illustrative embodiments, metadata, captions, or other textual information may be associated with the portions of visual/audio content to describe or summarize the visual/audio content such that textual analysis, e.g., NLP analysis, is all that is needed to identify personality traits to be associated with the portions of content.

While the above description assumes that the aggregate audience model is generated a priori based on an identification of the audience members via a registration or sign-up mechanism, in other illustrative embodiments the aggregate audience model may also be generated and used dynamically while the performance is being performed. For example, rather than having to utilize a registration or sign up mechanism to identify audience members, audience members may be automatically identified in response to the audience members sending communications through one or more communication channels during the performance. For example, if audience members are sending instant messages about the performance via an instant messaging service or system, the identification of the audience members may be performed by capturing the instant messages, correlating them with an account or profile of the audience member associated with the particular instant messaging service, and then building the aggregate audience model based on the identified audience member's characteristics in their associated account/profile in the manner previously described above. Thus, for example, if the instant messaging service is the Twitter® messaging service, then audience member Tweets about the performance may be captured and the corresponding audience member's Twitter profile may be identified and the characteristics specified in the profile may be analyzed to identify one or more personality traits associated with that audience member. Messages about the performance may be identified by unique identifiers associated with the messages, such as hashtags (#), geolocation of the messages, identifiers of users, timing of the messages, e.g., timestamps of the messages, being during a time period scheduled for the performance, or any combination of such identifiers.

Moreover, a context based analysis of the messages can be performed to associate an individual's message within a geolocation and time frame as to whether it is on topic for the associated performance. That is, either individually, or in combination with the other identifiers mentioned above, or their equivalents, natural language processing of the messages themselves may be performed to extract key terms/phrases indicative of the topic of the message and this topic may be correlated to a known topic of the performance so as to identify the message as being related to the performance. For further corroboration, a timestamp of the message may be correlated to the time frame of the performance and/or one or more of the other indicators may be utilized to further corroborate that the message is about or otherwise associated with the performance.

The audience member's personality traits may be aggregated with the other audience members that have exchanged communications about the performance to thereby generate an aggregate audience model. Thus, in this illustrative embodiment, only a sub-set of the audience members may be used to generate the aggregate audience model representing the entirety of the audience, i.e. only those audience members that choose to exchange communications about the performance via one or more communication services. This aggregate audience model may be continuously adjusted as more audience members exchange communications. It should be appreciated that an aggregate audience model generation may be triggered only after a predetermined number of different audience members exchange communications about the performance so as to not cause the performance to be customized for a minority of the audience members or indicators output to the performer based on a minority of the audience members.

Thus, the mechanisms of the illustrative embodiments provide the functionality for identifying audience member personality traits and using these personality traits to generate an aggregate audience model that represents and aggregation of the personality traits of the audience members, i.e. models the entire audience as a single audience member having a particular set of personality traits. The aggregate audience model may be used to identify portions of a performance that are most likely to be of interest or resonate with the audience members. This identification may then be used to output an indication to a user of those portions of the performance that are most likely of interest or resonate with the audience members and/or automatically or semi-automatically modify the performance based on the identification of these portions.

In addition to analyzing the personality traits of audience members to generate an aggregate audience model that is used to identify portions of the performance that will be most likely to be of interest or resonate with the audience, the illustrative embodiments may further evaluate the communications themselves that are being exchanged by the audience members to identify feedback information that can be used to output indications to a performer and/or modify the content of the performance or the manner by which the performance is performed. Natural language statements provided by the audience members via their communications, e.g., instant messages, website posts, or the like, via one or more communications services may be analyzed using NLP mechanisms to identify terms/phrases that are recognizable as indicative of feedback on a performance both positive and negative. The terms/phrases that are recognized by the NLP mechanisms may be evaluated to determine if they are associated with other terms/phrases indicative of positive or negative context. Entries in a feedback data structure may then be added, or counts of corresponding already existing entries may be updated, to indicate the number of audience members providing the various feedback information. Thus, for example, a first audience member may tweet the message "Too much use of hands" and another audience member may tweet the message "I wish he would not use his hands so much". Both of these messages would be analyzed using NLP mechanisms and it would be determined that both deal with the presenter's use of hands and both have negative context indicating that the presenter is using their hands too much while speaking. The content of the messages may be identified through term matching, sentence similarity against a known set of performance objectives that are stored in natural language, or any other known or later developed NLP technique.

The feedback information from multiple audience members may be aggregated to obtain an aggregate feedback model. The aggregation may comprise an aggregation operation similar to that of the personality traits of the audience members discussed above. Thus, once a certain predetermined number of audience members indicate a similar feedback in their communications, then the aggregate feedback model may indicate this feedback as well. The aggregate feedback model represents a consensus of audience member feedback as to where the performance may be improved.

The aggregate feedback model may be used to generate output messages, cues, highlighting, or the like, to the performer so as to give the performer feedback as to ways to improve the performance such that the performance will resonate more, or be of more interest to, the audience. For example, terms/phrases that indicate areas of interest of the audience may be identified, via NLP mechanisms, in communications sent by the audience members, places where the audience would like more detailed information, and the like. In some instances, the aggregate feedback model may inform the performer of things that are distracting to the audience, such as hand motions used by the performer, use of distracting terms or phrases such as "ummm" or "you know," the performer speaking too much or not loud enough, the audio equipment not working well on the left side of the auditorium, or the like.

In some illustrative embodiments, an agenda goals or objectives data structure may be associated with the performance data that specifies certain types of audience feedback that a presenter, creator, or other individual associated with the performance wishes to elicit from the audience. For example, a presenter may wish to elicit feedback indicative of the audience finding the presentation to be useful, the presentation to be well presented, or the like. These agenda goals or objectives may be evaluated against the aggregate feedback model generated by the mechanisms of the illustrative embodiments to determine where feedback represented in the aggregate feedback model indicates that the goals/objectives have or have not been met. The identification of goals/objectives that have and have not been met may be correlated with the personality traits of the audience as specified in the aggregate audience model to provide further insight into why or why not the goals/objectives were or were not met by the performance. As a result, the performer may be provided with feedback analysis after the performance to indicate whether the performer should place much credibility in the feedback received or not, and where the performer may be able to improve their performance in the future for a similar type of audience.

For example, the illustrative embodiments may further provide an aggregate feedback model analysis engine which takes as input the aggregate feedback model, the aggregate audience model, and the performance goals/objectives data structure associated with the performance data, and evaluates whether the aggregate feedback model includes feedback information that corresponds to performance goals/objectives specified for the performance. For example, terms/phrase matching, taking into account synonyms, antonyms, and other related terms/phrases and terminology, may be performed using natural language processing mechanisms to correlate feedback with goals/performance, e.g., feedback indicating that the performance was boring may be correlated with a goal of the audience finding the performance of interest or feedback indicating that the performance was informational may be correlated with goals of the performance being useful.

If one or more of the feedback elements in the aggregate feedback model correlates to a goal or objective set forth in the performance goals/objectives data structure, then the aggregate feedback model analysis engine may further analyze the aggregate audience model to determine the underlying reasoning as to why the feedback may have been provided by the particular audience based on the aggregate audience personality traits. That is, a correlation between the type of feedback, its positive/negative nature, the personality traits of the audience, and the alignment of the personality traits of the audience with the performance goals/objectives, may be generated to determine an underlying reasoning for the particular feedback.

For example, if the feedback element in the aggregate feedback model indicates that the audience found the performance to be too detailed, and the aggregate personality trait of the audience is of a "big picture" or "extrovert" nature, then it may be determined that the reason for the feedback being negative in this regard is not necessarily because the performance itself was poorly performed, but rather that the performance was not in line with the level and type of information that the audience resonates with. A corresponding output may be generated to the performer that the performance could be improved for this particular type of audience if less detailed information is presented and a more general overview or high level inter-relationship type performance is provided, e.g., "The audience stated the performance was too detailed because the audience is comprised primarily of 'big picture' type of individuals. To better resonate with this type of audience, you can modify your performance to focus more on a high level discussion than details." In other instances, it may be determined that certain negative type personality traits may be the cause of the negative feedback and thus, the performer can be assured that the feedback is of less importance, e.g., "The audience found your presentation disturbing. However, this feedback is more due to the audience being primarily composed of neurotic individuals than the performance itself." Thus, the illustrative embodiments, through analysis of the aggregate feedback model, the performance goals/objectives, and the aggregate audience model, can provide feedback outputs to the performer to inform the performer of the underlying reasons for the feedback, determine a relative weight the performer should give the feedback based on the alignment of the feedback and the audience personality traits, and provide suggestions for improving the performance. Moreover, the feedback output may incorporate the personality traits of the aggregate audience and information about how these personality traits align with the goals/objectives of the performance in order to determine the weighting the performer should give to the feedback, e.g., seriously consider the feedback, disregard the feedback, or the like.

As noted above, the mechanisms of the illustrative embodiments may be used to modify a performance both a priori and during a performance and/or output cues, messages, of other feedback to the performer(s) to guide them as to where improvement of the performance may be made for the particular audience. This modification and feedback may be performed based on aggregate models of the audience personality traits and/or audience feedback communications exchanged during the performance. Natural language processing mechanisms may be used to identify personality traits and feedback from communications exchanged by the audience members.

To further illustrate this, consider a scenario in which a presenter is going to present a topic to an audience as part of a conference. A person creates slides and other video/audio content to be included in the conference presentation. The creator may annotate the content of the slides with personality trait tags from a predefined recognizable set of personality trait tags. In addition, or alternatively, an automated mechanism may process the content of the presentation to identify portions of the content that is associated with various types of personality traits and then associate corresponding personality trait tags with those portions of content. For example, natural language processing may be performed on textual content of the presentation to identify terms/phrases indicative of particular personality traits and then associate personality trait tags with the identified portions of content. As a result, personality traits are associated with particular portions of the presentation content.

Members of the audience of the conference presentation may be identified a priori based on registration or sign-up processes where a person may establish an account/profile or otherwise inform the system of a communication service with which the audience member already has an established account/profile. The audience member's account/profile may be analyzed to identify personality traits associated with the audience member.

In some illustrative embodiments, the audience member's previous communications via the communication service may be identified and analyzed, such as by using NLP mechanisms, to identify communications that are indicative of one or more personality traits and thereby identify personality traits of the audience member. For example, if a previous communication via Twitter® is of the type "hate statistical analysis" then it may be determined that the audience member is more of a big-picture or abstract thinker than a details oriented individual. Of course an accumulation of analysis may be made to determine what the actual personality traits of the audience member are over both the personality traits determined from the audience member account/profile and/or the NLP analysis of the audience member's previous communications.

The personality traits are added to an aggregate audience model which can weight the personality traits according to their representation in the total number of audience members. Based on the weights of the personality traits of the aggregate audience model, those personality traits meeting a predetermined threshold weight may be used to match to personality traits in the presentation content.

Those portions of the presentation content that match to one or more of the personality traits of the aggregate audience model are identified and speaker notes associated with those portions may be accentuated, cues may be added to the presentation, portions of slides may be highlighted or otherwise made conspicuous, subsets of slides associated with the identified matching portion of the presentation content may be identified and used to swap in for other slides or otherwise be added to the presentation, alternative versions of slides may be swapped for slides in the presentation, or the like. Thus, if it is determined that the audience is conscientious, detail oriented, or the like, speaker notes directed to underlying statistics, regulations, organizational procedures, and the like, may be highlighted, slides directed to the discussion of statistics, regulations, and the like may be highlighted or otherwise emphasized, alternative slides that show a numerical basis for a concept or details of a regulation or organizational procedure may be swapped into the presentation in place of other slides or otherwise added to the presentation, and the like. This may be done semi-automatically by indicating to the creator of the presentation where such modifications could be made and requesting confirmation from the creator to make the modifications. Alternatively, these modifications may be made automatically. In this way, the presentation is modified to the intended audience to which it is to be presented.

During presentation of the slide presentation to the audience, communication channels of one or more communication services may be monitored to identify personality traits of a subset of the audience members exchanging communications about the presentation. These communications may be analyzed using NLP mechanisms to identify text indicative of audience member traits with these traits being aggregated into a dynamically generated aggregate audience model. The personality traits of the dynamically generated aggregate audience model may be compared to personality trait tags associated with various portions of content in the presentation to thereby again modify the presentation, highlight portions of the presentation, or provide messages, cues, or the like to guide the presenter in presenting the slide presentation in such a manner as to resonate with the audience. Thus, for example, even though the a priori customization of the presentation for the aggregate audience model may have determined that slides directed to statistical information about various aspects of an organizations operations was appropriate for the intended audience, during the presentation there may be information indicating that the audience members submitting communications via the communication channels do not have personality traits corresponding to these slides and thus, a cue may be output to the presenter to limit the time that the presenter spends discussing these slides.

Furthermore, the content of the specific communications submitted by the audience members may be analyzed using NLP mechanisms to thereby identify feedback information in the communications indicative of feedback on various aspects of the presentation, e.g., speaker mannerisms, the way in which the speaker presents the content, the content itself in the presentation, the manner by which the content is presented in the presentation itself, and the like. Thus, for example, if a plurality of audience members indicate that the speaker is moving too much on stage, is using his/her hands too much, is speaking too quickly, is concentrating on content that is not of interest to the audience, or the like, this information may be extracted from the communications submitted by the audience members and used to generate an aggregate feedback model that models the feedback as the feedback of a single audience member. The feedback may then be used to modify the presentation, highlight portions of the presentation, present visual/textual cues to the presenter, and/or the like. Thus, for example, a message may be output to the speaker to speak louder, to stop using their hands so much, or minimize speaking about statistics, or the like.

In some illustrative embodiments, the feedback obtained from audience members and used to generate an aggregate audience model may be used to automatically modify the operation of equipment associated with the performance. Thus, for example, if the audience members indicate that they cannot hear the speaker, the volume of the audio equipment may be automatically adjusted t increase the volume. Alternatively, a message may be output to the speaker or other individual involved in the performance to inform them of a need to modify the equipment's operation so as to facilitate a better experience for the audience.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
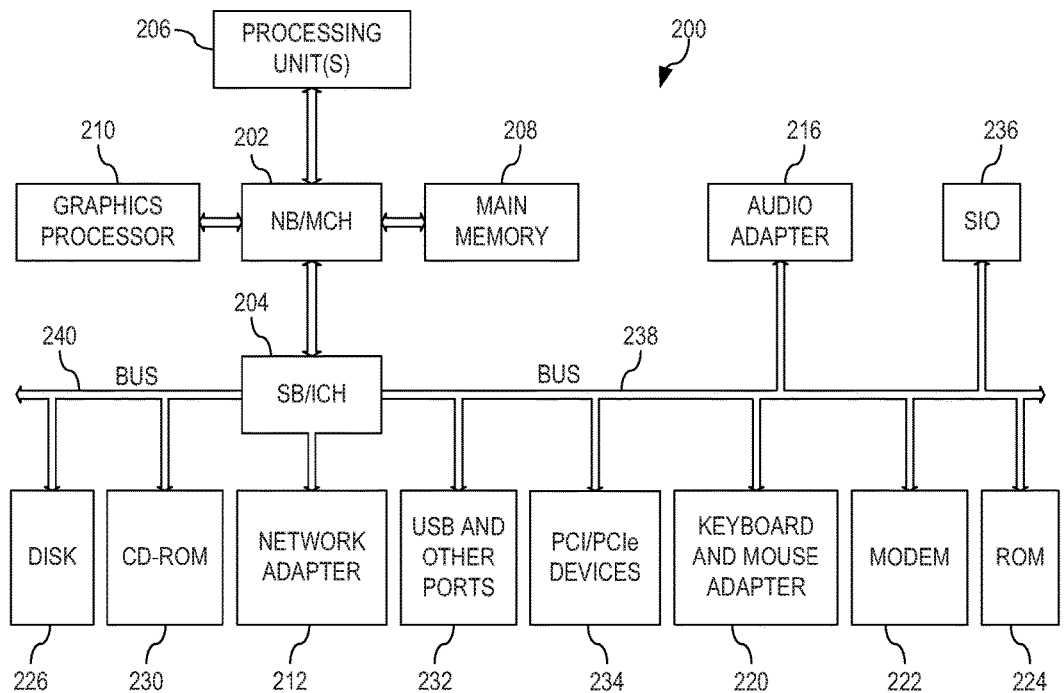
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, a server 104 is augmented to include a performance customization engine 120 in accordance with the illustrative embodiments. The performance customization engine 120 comprises an aggregate audience model generation engine 122 and an aggregate feedback model generation engine 124. Moreover, the performance customization engine 120 comprises a performance modification engine 126 and performer communication engine 128. One or more of the servers 104, 106 may further comprise one or more communication services 130, 140 for facilitating communications by audience members. The communication services 130, 140 may further comprise service subscriber accounts/profiles 132, 142, as well as logs of communications 134, 144.

The aggregate audience model generation engine 122 generates an aggregate audience model based on personality traits identified in, or based on information provided in, audience member accounts/profiles either specifically established with the performance customization engine 120 or with the communication services 130, 140, e.g., accounts/profiles 132, 142, or both. The aggregate audience model generation engine 122 may further analyze communications in the logs of communications 133, 144 using NLP techniques to identify terms/phrases and concepts that are indicators of personality traits which are then used to generate the aggregate audience model. The generation of the aggregate audience model may be performed prior to and/or during the performance.

The aggregate feedback model generation engine 124 analyzes communications in the logs 134, 144 to identify communications from audience members and the terms/phrases and other concepts in the communications indicative of audience member feedback during a performance. The audience member feedback identified by the aggregate feedback model generation engine 124 are used to generate an aggregate feedback model.

The performance modification engine 126 comprises logic for modifying the performance based on the aggregate audience model. For example, different portions of the performance may be highlighted, replaced with other portions of the performance, or any other modification that facilitates customizing the performance to the personality traits specified in the aggregate audience model. The performer communication engine 128 similarly modifies the performance, equipment used to provide the performance, and/or generates highlighting or outputs for guiding a performance in their performance so as to improve the experience of the audience based on the aggregation of the audience feedback identified in the communications submitted by audience members.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As mentioned above, the illustrative embodiments provide mechanisms for generating aggregate audience models and aggregate feedback models. The aggregate audience models specify personality traits of the audience as a whole, or at least a portion of the audience providing communications via one or more communication services. The aggregate feedback model provides a representation of the overall feedback from audience members. These models may be used to modify a performance and/or output messages and cues to a performance to assist the performer in presenting a performance that will more likely resonate with the audience of the performance.

Figure 3:
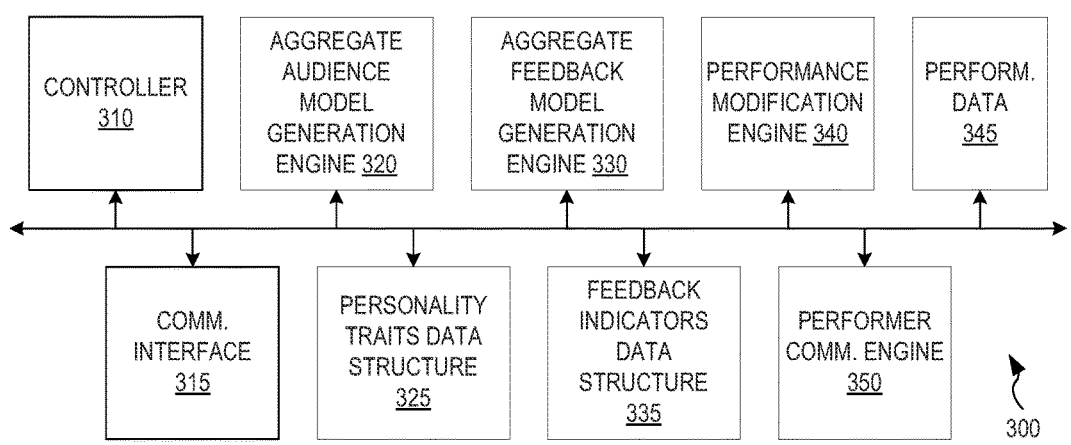
FIG. 3 is an example block diagram of the primary operational elements of a performance customization system in accordance with one illustrative embodiment.

FIG. 3 is an example block diagram of the primary operational elements of a performance customization system in accordance with one illustrative embodiment. As shown in FIG. 3, the primary operational elements of a performance customization system 300 comprises a controller 310, communication interface 315, an aggregate audience model generation engine 320, a personality traits data structure 325, an aggregate feedback model generation engine 330, a feedback indicators data structure 335, a performance modification engine 340, a performance data storage 345, and a performer communication engine 350. The controller 310 controls the overall operation of the performance customization system 300 and orchestrates the operation of the other elements 315-350. The communication interface 315 provides an interface through which data may be received and output from/to server computing devices, client computing devices, and the like, such as via one or more data communication connections, links, networks, or the like.

The aggregate audience model generation engine 320 comprises logic for accessing audience member accounts and/or profiles to obtain information indicative of particular personality traits the audience member. Moreover, in some illustrative embodiments, the aggregate audience model generation engine 320 comprises natural language processing (NLP) logic for processing previously exchanged communications and/or real time communications from audience members to identify terms/phrases, content, or other indicators of personality traits in the communications of the particular audience member. The terms/phrases, content, and other indicators of personality traits may be specified in a personality traits indicators data structure 335 which stores such terms/phrases, content indicators, and other indicators for each of a plurality of pre-defined personality traits such that they may be used to match instances of terms/phrases, content indicators, and the like, in the accounts, profiles, and/or communications of the audience member and thereby associate personality traits with the audience member. The aggregate audience model generation engine 320 may build a model of each audience member, or a subset of audience members that exchange real time communications during the performance, from the identified personality traits for the audience member. The aggregate audience model generation engine 320 may then aggregate these models of the audience members to generate an aggregate audience model which may then be used to modify a performance and/or output message or cues, emphasis of portions of the performance, modify the operation of equipment during the performance, or the like.

The aggregate feedback model generation engine 330 monitors communications exchanged by audience members using one or more identified communication services, to thereby identify communications providing feedback information from the audience members about the performance. The aggregate feedback model generation engine 330 may utilize recognized feedback terms/phrases, content indicators, and the like to identify feedback about the performance. These recognizable feedback terms/phrases, content indicators, and the like may be stored in a feedback indicators data structure 335 which may be used by the logic of the aggregate feedback model generation engine 330 to perform natural language processing of communications to identify when a communication is providing feedback from an audience member during the performance.

The aggregate feedback model generation engine 330 may then analyze, using natural language processing, the communications to determine whether these terms/phrases, content indicators, or the like, are associated with positive or negative feedback. That is, positive and negative terminology is recognized by the aggregate feedback model generation engine 330 and associated with the corresponding feedback terms/phrases, content indicators, or the like. For example, having recognized the term/phrase "hands", and the negative term/phrase "too much use", the aggregate feedback model generation engine may identify a negative context with the performer's use of hands. Similarly, feedback of the type "I like the use of graphs" or "The examples are good" may be identified and associate examples and graphs with positive feedback elements.

The aggregate feedback model generation engine 330 may generate an aggregate feedback model by compiling the various feedback elements extracted from communications from audience members and weighting them according to frequency of occurrence or otherwise calculating a feedback value for these elements to determine which are indicative of the audience as a whole or at least the subset of the audience that is providing communications during the performance. Other mechanisms for calculating or generating an aggregated feedback model from a plurality of feedback elements extracted from real time communications of audience members may be used without departing from the spirit and scope of the illustrative embodiments.

The performance modification engine 340 comprises logic for modifying a performance based on an aggregate audience model and/or aggregate feedback model generated by the aggregate audience model generation engine 320 and aggregate feedback model generation engine 330, respectively. The performance itself may be represented by the performance data storage 345 which may store the data for the audio/video content of the performance, e.g., slides for a presentation, video and/or audio for output during the performance, lighting controls, teleprompter data, electronic representations of speeches, or any other data representative of content to be included in a performance. The modifications of the performance may modify the performance data in the performance data storage 345. These modifications may take many different forms including changing portions of content that will be part of the performance, highlighting portions of the performance, highlighting speaker notes, adding cues to the performance data, adding performance suggestions or messages to be viewed/heard by a performer, modifying commands or settings for use by equipment used during the performance, or any of a plethora of other modifications that may be made based on the aggregate audience model. As discussed above, this can be done prior to the performance and/or dynamically as the performance is being performed.

The performer communication engine 350 operates based on the aggregate feedback model generated by the aggregate feedback model generation engine 330 to output messages to the performer(s) to inform them of a desire to modify the performer's performance or the content of the performance. These messages may be in the form of cues, highlighting of portions of the speaker notes or content of the performance, stage directions on a teleprompter or other messaging equipment, or the like. The performer communication engine 350 operates dynamically during the presentation of the performance based on the real time dynamic analysis of communications from audience members to identify feedback elements and/or audience member personality traits which in turn lead to an aggregate feedback model and aggregate audience model.

The operation of each of these elements will be described in greater detail, in accordance with illustrative embodiments, in the description of FIGS. 4-17 hereafter. For simplicity and consistency of the description, it will be assumed that the performance that is the focus of the operation of the illustrative embodiments is a presentation of subject matter at a conference with the performance data 345 being slides to be displayed as part of the presentation (performance). It should be appreciated that while a slide presentation will be used as an example hereafter, the illustrative embodiments are not limited to such and any performance that comprises audible or visual content may be the subject of the mechanisms of the illustrative embodiments without departing from the spirit and scope of the present invention. It should be appreciated that, depending on the nature of the performance, the performance data 345 may take many different forms but regardless, the mechanisms of the illustrative embodiments may comprise logic and other mechanisms for customizing such performance data based on an aggregate audience model and/or aggregate feedback model.

I. Audience Member Profile Analysis

Figure 4:
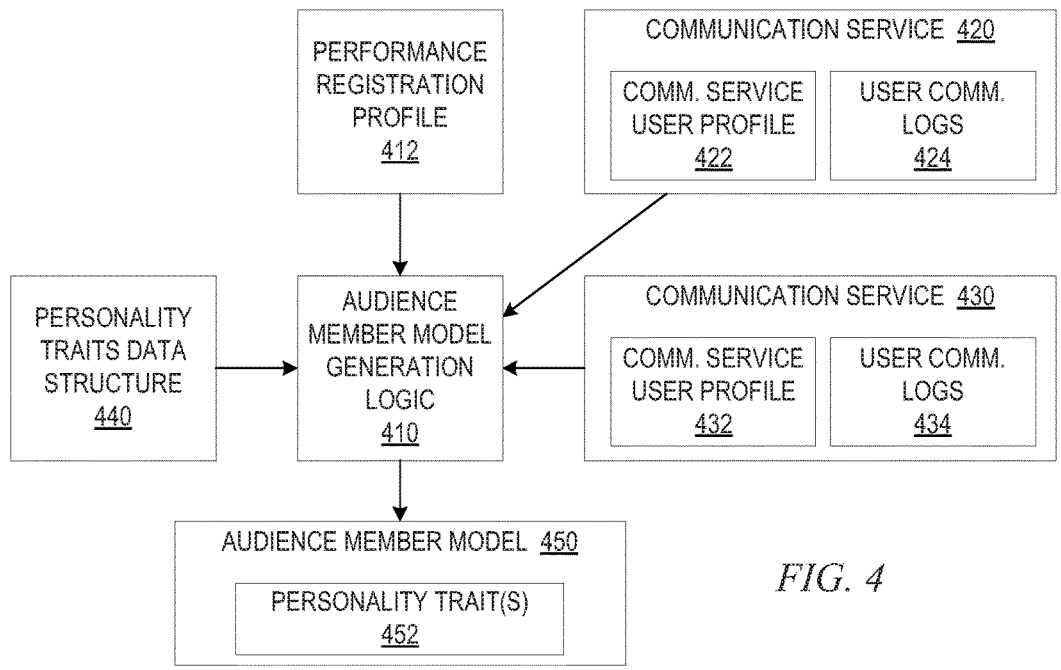
FIG. 4 is an example diagram illustrating a process for generating an audience member profile in accordance with one illustrative embodiment.

FIG. 4 is an example diagram illustrating a process for generating an audience member profile in accordance with one illustrative embodiment. The operation outlined in FIG. 4 may be implemented, for example, by logic of the aggregate audience model generation engine 320 in FIG. 3, for example. That is, the aggregate audience model generation engine 320, before aggregating audience member models, may first generate a plurality of audience member models in accordance with the operation outlined in FIG. 4. The logic of the aggregate audience model generation engine 320 may be implemented as software executed on hardware resources, dedicated hardware logic, or a combination of software executed on hardware resources and dedicated hardware logic.

As mentioned above, the illustrative embodiments leverage the facilities of audience member profiles, specifically obtained for the particular performance or obtained through other already existing computer systems, and network based communication mechanisms, to generate an aggregate audience model that represents an aggregate of the personality traits of the members of an audience of a performance. This may be done prior to the performance such that the performance may be tailored or customized for the particular audience based on the aggregate audience model. This may also be done in real-time while the performance is being performed such that cues and modifications to the performance may be made in real-time.

As shown in FIG. 4, an audience member profile for a particular audience member may be specifically generated for the particular performance as a performance registration profile 412. That is, in one illustrative embodiment, when a performance audience member signs up for, buys tickets for, registers with an organization providing the performance, or otherwise indicates that they will attend a performance, information is gathered from the performance audience member indicating either explicitly one or more personality traits of the audience member, or other information from which a personality trait or traits may be determined. This may be done, for example, when the performance audience member creates an account or profile with the provider of the performance. For example, a person may establish an account/profile with a particular performance provider and, in the process, the person may provide information about himself/herself that is indicative of the person's personality trait. This information may be of various types including the person's occupation, hobbies, age, gender, other types of performances they have attended, likes, dislikes, and the like. The person may further explicitly state what they believe are their personality traits.

Thus, for example, if a person is wanting to attend a presentation on recent developments in cancer treatments at a medical conference, the person registers with a company sponsoring or providing the medical conference. In registering with the sponsor/provider, the person inputs personal information about the person including identification information (e.g., name), contact information (e.g., physical address, email address, telephone number(s), instant messaging service identifier(s), and the like), occupation information, demographic information (e.g., age, gender, etc.), other information indicative of areas of interest to the person (e.g., hobbies, likes, dislikes, subject matter of the conference that is of interest, etc.), and the like. In some illustrative embodiments, the person may further specify personality traits that the person considers to be representative of their own personality. This information may be entered via one or more graphical user interfaces through free form text entry, selection of options from one or more menus of pre-defined inputs, or any other generally known graphical user interface elements.

For example, a user may interact with a graphical user interface of a website provided via an Internet Browser application for registering for a conference. As part of this registration, the user may enter the above information as well as select from a menu one or more inputs specifying the user's personality traits, e.g., introverted, extroverted, detail oriented, abstract thinker, conscientious, etc. The combination of the entries by the user and the selections of pre-defined entries may be combined into an account or profile for the user. While one illustrative embodiment may provide the ability for the user to specify their own personality traits, this is not required. To the contrary, personality traits of the user may be determined through analysis of the other inputs from the user even in the case where the user does not explicitly indicate the user's personality traits in the account or profile.

This information may be stored as a performance registration profile 412 associated with the sponsor/provider and may be input to the audience member model generation logic 410. The audience member model generation logic 410 may analyze the performance registration profile 412 to identify indicators in the performance registration profile 412 that indicate particular personality traits. The correspondence of indicators with particular pre-defined personality traits may be specified in the personality traits data structure 440, which may be the same personality traits data structure 325 of FIG. 3. For example, the personality traits data structure 440 may map or correlate a personality trait, e.g., introvert, with particular indicators including specific terms/phrases, occupations, hobbies, likes, dislikes, and the like, e.g., accountant, programmer, book reader, likes video games, dislikes crowds, etc. The indicators in the performance registration profile 412 may be compared to the indicators in the personality traits data structure 440 to identify any matching personality traits. It should be appreciated that natural language processing (NLP) may be implemented on free-form text and other inputs provided by the user to generate the performance registration profile 412 and thereby extract the indicators for use in identifying personality traits of the user.

In the case of an embodiment where the user specifies his/her own personality traits in the performance registration profile 412, these designations of personality traits may be simply used instead of having to analyze the remaining portions of the performance registration profile 412. Alternatively, this user self designation of personality traits may be combined with the analysis of other information in the performance registration profile 412 to determine an actual set of performance traits for the user. That is, a user may not have an objective view of their own personality and thus, may be inaccurate in their own assessment of their personality traits. Through analysis of other indicators in the performance registration profile 412, the user's assessment of their personality traits may be verified and/or augmented. A weighted evaluation of the user's specification of personality traits and the other indicators of personality traits may be used to generate a final set of personality traits for the user, e.g., with the user's specification of personality traits potentially be provided greater weight than the personality traits identified through analysis of the indicators.

The personality trait(s) 452 identified as being associated with the user may be stored in an audience member model 450 in association with an identifier of the user (now audience member). This audience member model 450 may, as described hereafter, be combined with other audience member models to generate an aggregate audience model.

It should be noted that in some illustrative embodiments, either in addition to, or in replacement of, the performance registration profile 412, profiles associated with the user obtained from other sources may be analyzed to obtain the personality traits 452 of the user. For example, an identifier of the user, as may be obtained through registration by the user, may be used as a basis for searching known websites, web services, or other sources of user information, for profiles or accounts associated with that user. In the depicted example, the known websites or web services include two communication services 420 and 430 which may be provided via one or more websites. In one illustrative embodiment, these communication services 420 and 430 comprise social networking and instant messaging services. For example, a communication service 420 may comprise a social networking website such as Facebook®, Pinterest®, LinkedIn®, and the like. Another communication service 430 may comprise an instant messaging website such as Twitter®, Instagram®, or other type of instant messaging service. User profiles 422, 432 may be established with these various services and may be identified based on the user identifier and analyzed in the manner described above to identify indicators in the profiles 422, 432 that are indicative of particular pre-defined personality traits specified in the personality traits data structure 440.

In addition, the communication services 420, 430 may store communication logs 424, 434 which store the logs of the communications generated and exchanged by the user via the corresponding communication service 420, 430. These communications are natural language communications which may be processed by natural language processing mechanisms to extract indicators of personality traits 452, such as by matching terms/phrases, content indicators, and the like, that may be correlated with personality traits 452 using the correlation information specified in the personality traits data structure 440.

For example, an audience member's postings on a social network may be analyzed to identify terms/phrases indicative of the types of terms/phrases that a person of a particular personality trait uses. Moreover, the postings may be further analyzed to identify areas of interest, interactions of the person with other individuals, events attended by the individual, or the like, that would be indicative of a particular personality trait. For example, a person that posts messages discussing how the person meets with friends in social settings, attends social events, is tagged in photos by other individuals, has a large following or listing of "friends", and the like, will be considered to be more of an extrovert and social person whereas a person that posts about book reading, television shows they watch, does not have postings about social events, and the like, may be more indicative of a person that is introverted and less socially minded. Various indicators of personality traits may be trained into the logic of the audience member model generation logic 410 and used to evaluate the audience member's interactions with social networks and other online communication services 420, 430 so as to build an idea of the personality trait(s) 452 of the audience member. This analysis of the communication logs 424, 434 may be performed in addition to, or instead of, the analysis of the user profiles 422, 432. Ultimately, the audience member model generation logic 410 generates a model of the audience member 450 which includes the identified personality trait(s) 452 of the user (audience member).

As mentioned above, the personality traits 452 may comprise traits such as introvert, extrovert, conscientious, detail-oriented, abstract thinker, big picture oriented personality, or any other classification of the personality of an individual. A single individual may have multiple personality traits. Each personality trait 452 of an individual is indicative of the types of information and level of information that the individual tends to be interested in and which will resonate with that individual. For example, an introverted person, detail-oriented person, or conscientious person may be more interested in details and specifics of a particular topic, to varying degrees, whereas an extroverted, abstract thinker, or big picture oriented person may be more concerned with general concepts, information about persons and relationships, or the like, again at varying degrees. Thus, by knowing a audience member's personality trait(s) 452, one can tailor or customize a performance, e.g., slide presentation, so that it is more likely to resonate with that particular audience member.

In order to identify such personality trait(s), the audience member model generation logic 410 comprises trained logic for analyzing the audience member's account or profile characteristics to score the characteristics relative to a plurality of pre-defined personality trait(s) in the personality traits data structure 440. The trained logic may evaluate the audience member's account/profile with the regard to characteristics in the account/profile that match the various personality trait(s). Personality trait(s) that are matched above a predetermined threshold number of times are considered to be representative of the audience member and thus, are established as personality traits 452 for that audience member.

Figure 5:
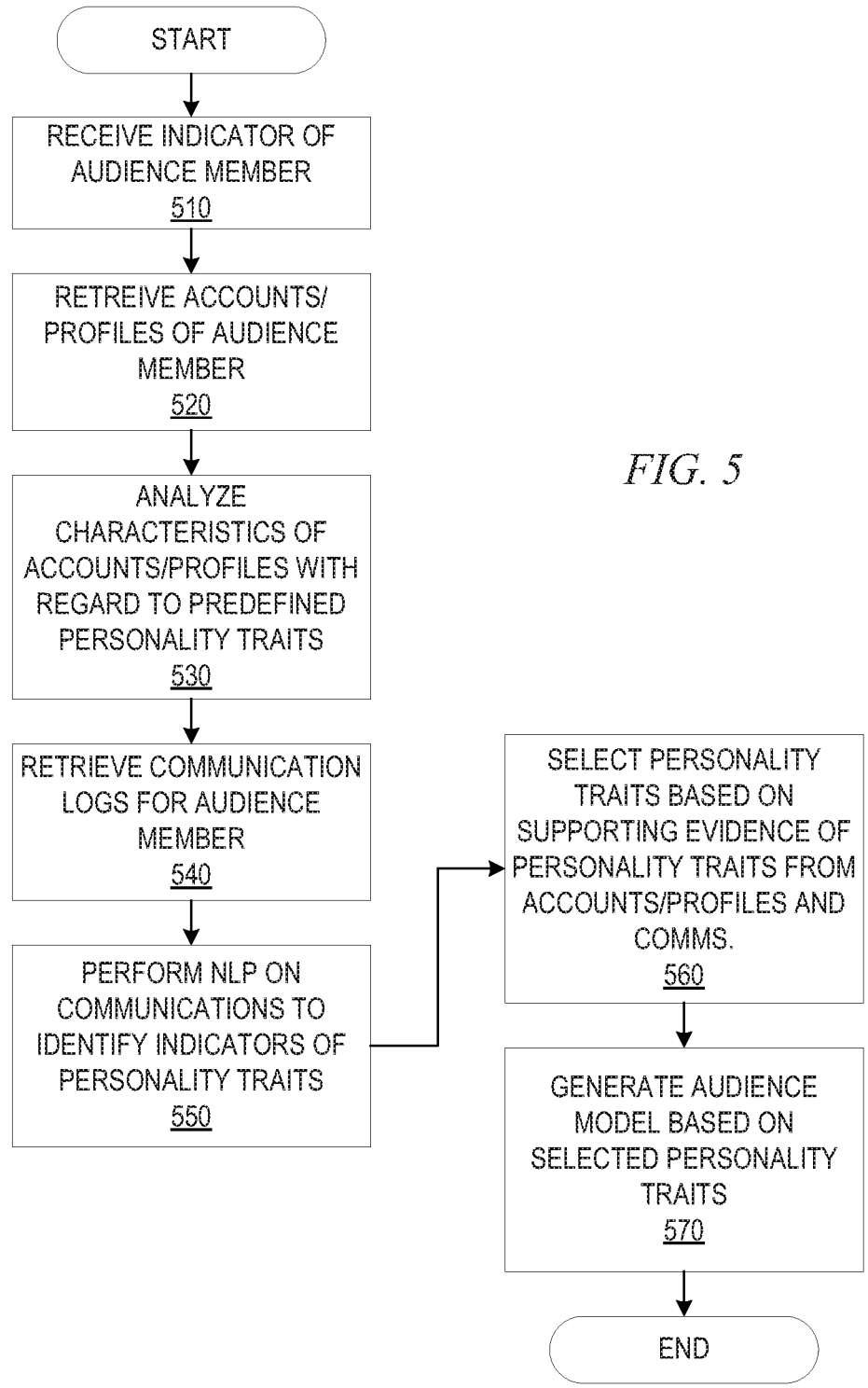
FIG. 5 is a flowchart outlining an example operation of an audience member profile generation engine in accordance with one illustrative embodiment.

FIG. 5 is a flowchart outlining an example operation of an audience member profile generation engine in accordance with one illustrative embodiment. As shown in FIG. 5, the operation starts with receiving an identifier of an audience member (step 510). This may be done by way of a registration process or other process that has access to identifiers of audience members for a particular performance. The identifier of the audience member may comprise the audience member's name, an employee identifier, a registration number for the performance, a seat number, an account number, of any other identifier that can be used to uniquely identify a particular individual.

Accounts/profiles associated with the audience member are retrieved based on the identifier of the audience member (step 520). As noted above, these accounts/profiles may be associated with social network websites, instant messaging services, and the like. In some embodiments, the accounts/profiles may include an account/profile specifically established for the performance or with an organization that provides or is otherwise associated with the performance.

Characteristics of the accounts/profiles are analyzed and compared against recognizable characteristics associated with pre-defined personality traits to identify personality traits to associate with the audience member (step 530). Communications in one or more communication logs associated with communication services and associated with the audience member may be retrieved (step 540) and analyzed, such as by using Natural Language Processing (NLP) on the text of the communications to identify indicators of personality traits as specified in the characteristics associated with personality traits in the personality trait data structure (step 550). The personality traits identified through analysis of the accounts/profiles and communication logs are compiled to identify supporting evidence for the various personality traits with the personality traits having the highest amount of supporting evidence, i.e. above a predetermined threshold, are selected as being representative of the audience member's personality traits (step 560). The selected personality traits are stored as an audience member model for the audience member (step 570) and the operation terminates. This operation may be repeated for a plurality of audience members so as to generate a plurality of audience member models that represent the personality traits of the plurality of audience members.

II. Generating an Aggregate Audience Model

Figure 6:
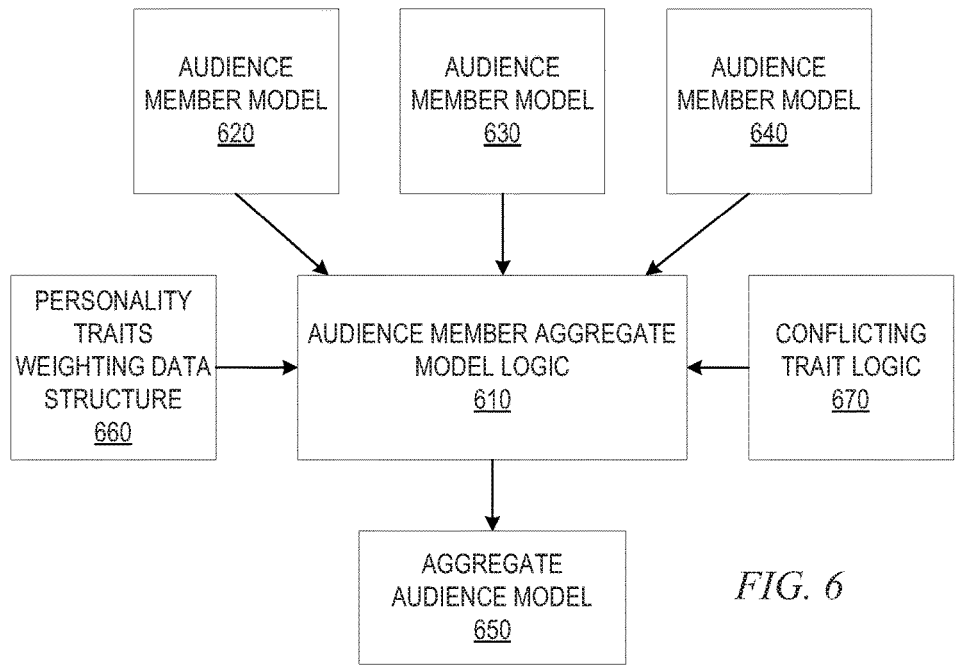
FIG. 6 is an example diagram illustrating a process for generating an aggregate audience model in accordance with one illustrative embodiment.

FIG. 6 is an example diagram illustrating a process for generating an aggregate audience model in accordance with one illustrative embodiment. The process outlined in FIG. 6 may be implemented, for example, by logic of the aggregate audience model generation engine 320 in FIG. 3, for example. The logic of the aggregate audience model generation engine 320 may be implemented as software executed on hardware resources, dedicated hardware logic, or a combination of software executed on hardware resources and dedicated hardware logic.

Further to the discussion of FIGS. 4 and 5 above, having generated the profiles of the audience members, an aggregate audience model may be generated based on the personality traits of the audience members. As shown in FIG. 6, a plurality of audience member models 620-640 generated for audience members of a performance using the mechanisms describe din FIGS. 4 and 5 may be input to audience model aggregation logic 610. The audience model aggregation logic 610 aggregates the personality traits of all of the audience member models 620-640 to generate a single aggregate audience model 650 that is representative of the personality traits of the audience as a whole, or at least a representative subset of the audience if the aggregate audience model is generated dynamically in response to audience members exchanging communications about the performance.

The aggregation may be generated in many different ways. For example, the aggregation may be a weighted aggregate of each of the personality traits of the various audience members. The weightings may be specified in a personality trait weighting data structure 660 and may be set by a subject matter expert (SME), learned via a machine learning process in which the aggregate audience model's ability to accurately reflect the audience's personality traits may be evaluated and the weights adjusted so as to better approximate the representative personality traits of the audience.

For example, percentages of the audience members being introverted, extroverted, conscientious, big-picture minded, abstract thinkers, and the like, may be generated. From this, a model of the audience may be generated that the audience is X % extroverts, Y % introverts, Z % abstract thinkers, etc. These percentages may be weighted so as to adjust their influence on the aggregate audience model 650. The scores associated with the various personality traits may then be compared against one or more thresholds to determine which personality traits have sufficient representation in the audience to warrant inclusion in the aggregate audience model 650. These personality traits may then be combined and stored in the aggregate audience model 650 as personality traits possessed by the audience.

It should be appreciated that in this process, it is possible that contrary or mutually exclusive personality traits may both appear in the aggregate audience model 650. However, in other illustrative embodiments, a set of one or more non-contrary or mutually exclusive personality traits of the audience as a whole may be generated based on one or more calculations or formulae, e.g., the audience is introverted and abstract thinkers (the audience traits would not be introverted and extroverted since these are mutually exclusive). If the audience were considered to be two or more personality traits that are contrary to one another or mutually exclusive, then a personality trait having a highest number of audience members of that trait may be selected or logic may be provided for selecting one personality trait over the other. The conflicting personality traits logic 670 comprises trained logic for resolving conflicting personality traits associated with the audience models 620-640 in this manner.

As mentioned previously, in some illustrative embodiments, the generation of the aggregate model may utilize a mean square weighted deviation that accommodates personality traits shifting among brackets of percentages of audience members. The weighting may be used to choose the top set or sets of personality traits to aggregate. Given a user model for each individual audience member, the matching personality traits across all individual audience members is found by taking the value given by the user model service for those traits. Non-correlating values that are one standard deviation away may be dropped so as to focus on the most similar sets of personality traits across the audience over the specified period of time. Thereafter, the rest of the remaining values associated with personality traits may be summed to generate values indicative of an aggregation score for the personality traits of the audience.

Thus, the illustrative embodiments provide mechanisms for generating audience member models representing each of the audience members as a collection of personality traits based on analysis of the audience member's accounts/profiles and/or previously or currently submitted communications via one or more social networks, instant messaging services, or other communication services. In addition, the mechanisms of the illustrative embodiments provide the ability to aggregate these audience member models to generate an aggregate audience model representative of the personality traits of the audience as a whole or at least a representative subset of the audience members, e.g., the audience members that have submitted communications about the performance.

Figure 7:
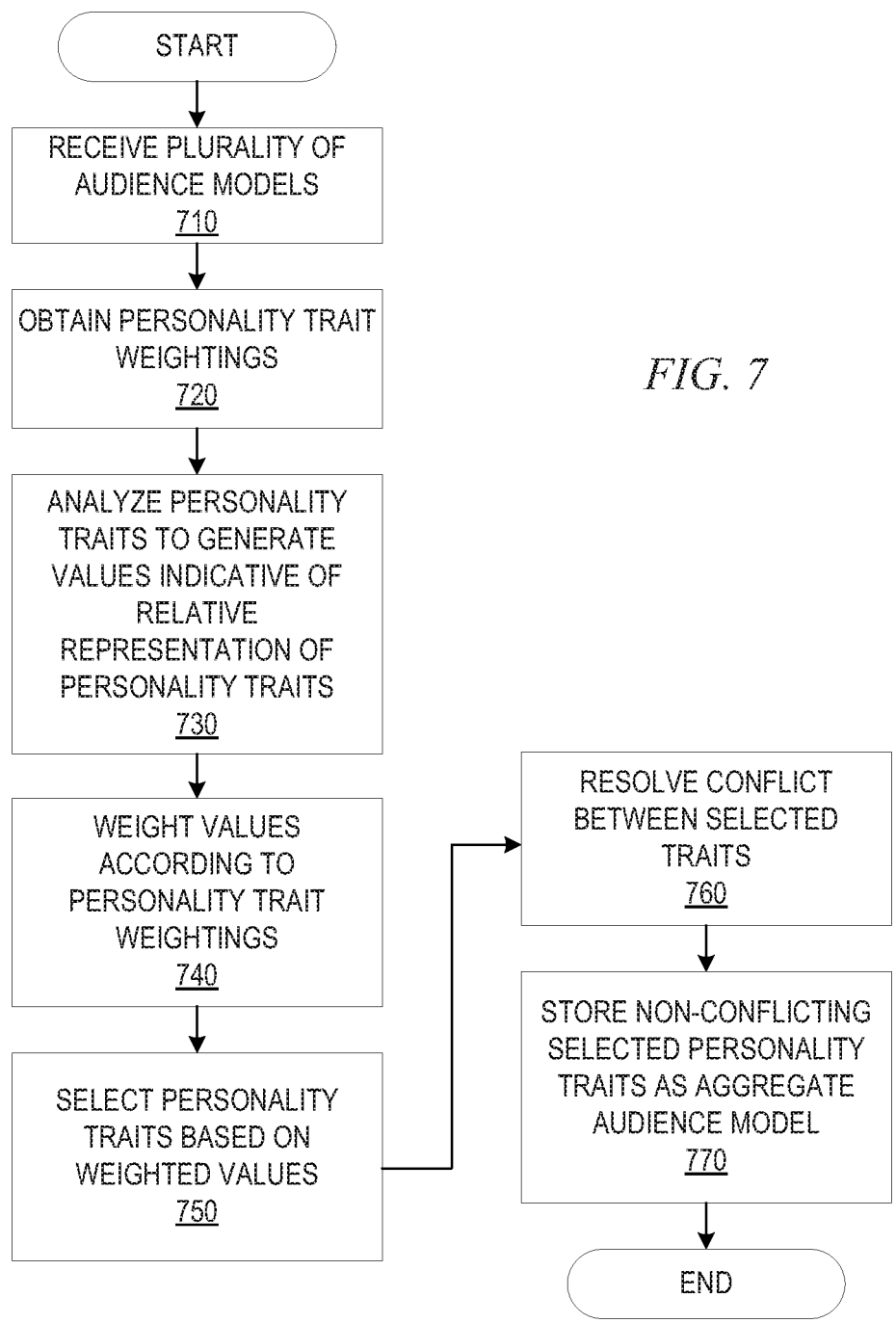
FIG. 7 is a flowchart outlining an example operation for generating an aggregate audience model in accordance with one illustrative embodiment.

FIG. 7 is a flowchart outlining an example operation for generating an aggregate audience model in accordance with one illustrative embodiment. As shown in FIG. 7, the operation starts by receiving a plurality of audience member models (step 710). Personality trait weightings, such as may be specified by an SME or learned through machine learning, are obtained (step 720). The personality traits of the various audience member models are combined to generate values indicating the relative representativeness of the personality trait in the audience, e.g., percentages of the audience that have the corresponding personality trait (step 730). The obtained weight values for the personality traits are then used to generate weighted scores for each of the personality traits (step 740).

Personality traits are selected based on the weighted scores (step 750) and any conflicts between the selected personality traits are resolved so as to remove the conflicts (step 760). The non-conflicting selected personality traits are then stored as part of an aggregate audience model (step 770). The operation then ends.

III. Aggregate Audience Model Based on Subtrait Alignments to Evidence

The illustrative embodiments described herein are described as being directed to personality trait based audience member models, aggregate audience models, user models, and aggregate user models. However, in some illustrative embodiments, these personality traits may be further sub-divided into sub-traits that help to define the personality trait. Using the sub-trait's terms, synonyms, and closely related concepts create a weighted term cloud that represents all the related terms. The weighted values for the personality traits are based on how a term is directly related to the sub-trait terms. To aggregate a single personality trait value, the sub-traits of the set of users must be within a specified range of the user personality trait and the set of evidence (data input to user modeling—text or metadata) that generated the personality trait must have a set of terms that are within the weighted term cloud and that exceeds a composite personality trait score threshold.

For example, the aggregate personality trait score or value may be calculated by combining all the related terms found in the evidence and finding the sum of the weighted terms divided by the number of terms in the evidence. The threshold score/value for the personality trait can be defined based on a normalization per personality trait type and defined as a percentage, for example the orderliness personality trait needs to have an aggregate personality trait score of over 40 percent to be included in the aggregate audience/user model. A another example, the personality trait "conscientiousness" has a set of sub traits "Achievement striving", "Cautiousness", "Dutifulness", "Orderliness", "Self-discipline" and "Self-efficacy". A set of terms related to each of the traits can be defined in a mapping data structure, or discovered through synonyms and concept expansion based on ontology or using a concept expansion service, such as the concept expansion service available through the IBM Watson™ cognitive system and described at the IBM Watson™ Developer Cloud documentation website. The set of terms may then be the set of terms to match against the evidence for a user.

For example, to determine weights, direct synonyms are weighted higher, similar concepts are weighted less than direct synonyms, and then the farther out a concept is from the main term in a graph, it is reduced by half. For example, direct matches are rated 1, synonyms are rated 75, and concepts are rated half, and subsequently reduced by half the farther out they are from the main concept related to the term.

Appendix A is an example of a personality trait tree illustrating the relationship between personality traits and sub-traits as a nested tree structure where sub-traits are children of personality traits and sub-traits may actually have additional children sub-traits. In this example, one can see that the personality trait "Conscientiousness" has the sub-traits "Altruism", "Cooperation", "Modesty", "Morality", "Sympathy", and "Trust" associated with it while the personality trait "Agreeableness" has the sub-traits "Anger", "Anxiety", "Depression", "Immoderation", "Self-consciousness", and "Vulnerability" associated with it. Each of these personality traits and sub-traits have associated percentages, categories, names, and identifiers. The percentages are calculated scores or values indicative of the level of representation of that personality trait or sub-trait in an analyzed portion of evidential data, e.g., text from messages exchanged by the particular audience member/user. In an aggregate model, the percentages represent the aggregate of the audience members/users individual percentages. Each of these personality traits and sub-traits may have associated terms, phrases, and other indicators that are recognizable in evidential data and which may be used to match against these personality traits and sub-traits to evaluate and calculate the score/value for that particular personality trait and/or sub-trait.

Thus, the personality traits referenced in the illustrative embodiments described herein may in fact be a combination of sub-traits which each have their own scores/values taken from evidential data. As mentioned above, the sub-trait terms, synonyms, and closely related concepts may be used to create a weighted term cloud that represents all the related terms. The weighted values for the personality traits are based on how a term is directly related to the sub-trait terms. To aggregate a single personality trait value, the sub-traits of the set of users must be within a specified range of the user personality trait and the set of evidence (data input to user modeling—text or metadata) that generated the personality trait must have a set of terms that are within the weighted term cloud and that exceeds a composite personality trait score threshold. Thus, through the use of a personality trait model of the type set forth above, or other appropriate personality trait model, model representations of audience members/users may be aggregated to generate an aggregate audience/user model representative of a group of individuals that can then be used to customize/modify a performance and/or perform other cognitive operations as described herein.

Figure 8:
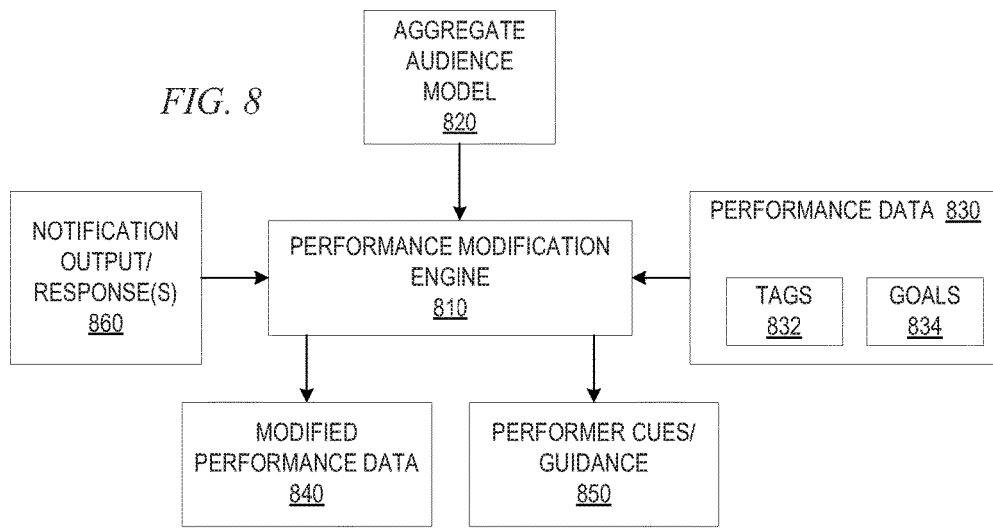
FIG. 8 is an example diagram illustrating a process for performing pre-performance customization of a performance based on a aggregate audience model in accordance with one illustrative embodiment.

IV. Pre-Performance Customization of Performance Based on Aggregate Audience Model FIG. 8 is an example diagram illustrating a process for performing pre-performance customization of a performance based on an aggregate audience model in accordance with one illustrative embodiment. The process outlined in FIG. 8 may be implemented, for example, by logic of the performance modification engine 340 in FIG. 3, for example. The logic of the performance modification engine 340 may be implemented as software executed on hardware resources, dedicated hardware logic, or a combination of software executed on hardware resources and dedicated hardware logic.

As shown in FIG. 8, the aggregate audience model 820 may be used as input to the performance modification engine 810 which uses the aggregate audience model 820 to modify performance data 830 and/or provide performers with cues and guidance as to modifications of the performer's performance that may be made to better resonate with the audience. For example, if the aggregate audience model 820 indicates that the audience in general is extroverted and abstract-thinkers, then parts of the performance, as represented in the performance data 830, directed to more detail oriented individuals may be of less interest to the audience as a whole than other portions of the performance that are more geared to abstract thinkers and extroverted individuals. The performance data 830 may be modified to accentuate the portions of the performance that are most likely to resonate or be of interest to the particular audience as determined from the personality traits of the aggregate audience model 820.

Modification of the performance may take many different forms and may be done pre-performance or dynamically as the performance is being performed, with the process in FIG. 8 being primarily directed to pre-performance modification of the performance data 830. For example, the aggregate audience model 820 in FIG. 8 is generated pre-performance in the manner previously described above and the personality traits of the aggregate audience model 820 may be compared to personality trait tags 832 associated with elements of the performance data 830. In other words, a performance creator, performer, or other individual may annotate portions of the performance data with metadata comprising personality trait tags indicating what personality trait people are likely to find those portions of the performance of interest or with which those portions of the performance is likely to resonate. These personality trait tags may be correlated with the personality traits of the aggregate audience model 820 by the performance modification engine 810 to identify which portions of the performance will more likely resonate with the audience or will be of more interest to the audience. The performance data 830 may then be modified or augmented with highlighting, cues, messages, or the like to accentuate the matching portions of the performance data 830 and/or swap in alternative versions of portions of the performance data 830 that match the personality traits of the aggregate audience model 820.

For example, consider the performance to be a presentation at a conference where the presentation data 830 comprises data representing slides and other visual/audio content. Each of the slides and other visual/audio content, if any, may be tagged by the creator of the presentation or other user with personality trait tags to indicate the personality traits with which the creator/user believes the slide content and/or other visual/audio content will resonate. Thus, for example, if a slide is directed to detailed numerical information, then a personality trait tag of "conscientious" and/or "introvert" may be associated with the slide while another slide directed to a general graph may be associated with a personality trait of "extrovert" or "big picture" or "abstract thinker" by assigning a corresponding personality trait tag. Of course, a default personality trait tag may also be utilized that identifies slides that must be present in the presentation regardless of other personality traits.

Again, the aggregate audience model 820 personality traits may be compared against the personality traits specified by the personality trait tags of the various portions of the performance to identify which portions of the performance match a personality trait in the aggregate audience model 820. Those portions of the performance that match the personality traits may be identified by the performance modification engine 810 and a notification 860 may be sent to the presenter, performer, or creator of the performance so as to bring to their attention the portions of the performance data 830 that are most likely to be of interest to the audience or resonate more with the audience. The presenter, performer, creator, or the like may then respond with instructions 860 to modify the performance data 830 to concentrate the performance on those portions that are identified as being of interest or resonating more with the personality traits of the aggregate audience model 820. For example, if the performance is a presentation, the slides and/or other visual/audio content may be selected for inclusion in the group of slides to be used to present information during the upcoming performance. If the performance is a play or other theatrical work, then scenes of the play or theatrical work may be selected for emphasis during the performance in some manner. If the performance is a musical performance, particular songs or musical works may be selected for inclusion in the musical performance. Any type of modification of a performance based on the tagging of portions of the performance with personality trait tags and the identification of an aggregate audience model 820 of personality traits of the audience may be used without departing from the spirit and scope of the illustrative embodiments.

Moreover, alternative versions of portions of the performance data 830 may be swapped for one another using the mechanisms of the illustrative embodiments. For example, a presentation creator may generate multiple slides for representing the same or similar information with one representation being determined by the creator to resonate more with detail oriented individuals while the other may be determined by the creator to resonate more with big picture or abstract thinker individuals. By tagging the slides accordingly with personality trait tags, and comparing these tags to the personality traits of the aggregate audience model 820, the presentation may be modified to adjust the presentation to the personality traits of the audience such that the presentation is more likely to be of interest or resonate with the audience by swapping in slides that have personality trait tags matching personality traits of the aggregate audience model 820 in place of slides that do not match or adding such slides into the presentation in addition to the already existing slides.

In some illustrative embodiments, rather than having to have the presenter, performer, creator, or the like, associate personality trait tags 832 with portions of the performance data 830, the association of the personality trait tags 832 may be performed automatically by the mechanisms of the illustrative embodiments. For example, Natural Language Processing (NLP) may be performed by the performance modification engine 810 on portions of text of the performance data 830 to identify key terms, phrases, concepts, or other content recognizable as being associated with particular personality traits. Corresponding personality trait tags 832 may be associated with these portions of the performance data 830 automatically to thereby annotate the performance data 830 with these personality trait tags. Moreover, other analysis mechanisms may be employed to analyze other portions of visual/audio content in the performance, e.g., image analysis, audio analysis, or the like. In some illustrative embodiments, metadata, captions, or other textual information may be associated with the portions of visual/audio content to describe or summarize the visual/audio content such that textual analysis, e.g., NLP analysis, is all that is needed to identify personality traits to be associated with the portions of content.

Based on the correlation of personality trait tags in the performance data 830, the performance data may be modified either automatically, or semi-automatically in response to instructions received by a human user via the notification/response mechanism 860. The resulting modified performance data 840 may be output for use in presenting the performance. In addition, any performer cues and guidance 850 generated by the performance modification engine 810, such as highlighting of portions of the performance data 830, additional cues and messages added to speaker notes, stage directions, or the like, may be output for use during the performance. The combination of the modified performance data 830 and performer cues and guidance 850 may be input to a performance data processing system which uses this input to generate output data for display to an audience and/or performer so as to facilitate the presentation of the performance.

As shown in FIG. 8, the performance data 830 may further have associated goals/objectives data structure 834. The goals/objectives data structure 834 stores indicators of goals/objectives that a performer associated with the performance is attempting to achieve, e.g., usefulness of the information conveyed, portraying knowledge of the subject matter, providing an engaging experience, or any other type of goal/objective that may be associated with a performance. This information, as mentioned above and described hereafter with reference to FIG. 12, may be used to compare audience feedback and audience personality traits to the goals/objectives to determine if the goals/objectives have been met and if not, what weighting to give to the audience feedback as well as a reasoning for the audience feedback. Moreover, the mechanisms of the illustrative embodiments may present suggestions as to how to improve the performance based on the feedback, audience personality traits, weight to be attributed to the feedback, and the degree to which the goals/objectives have been met or not met.

Figure 9:
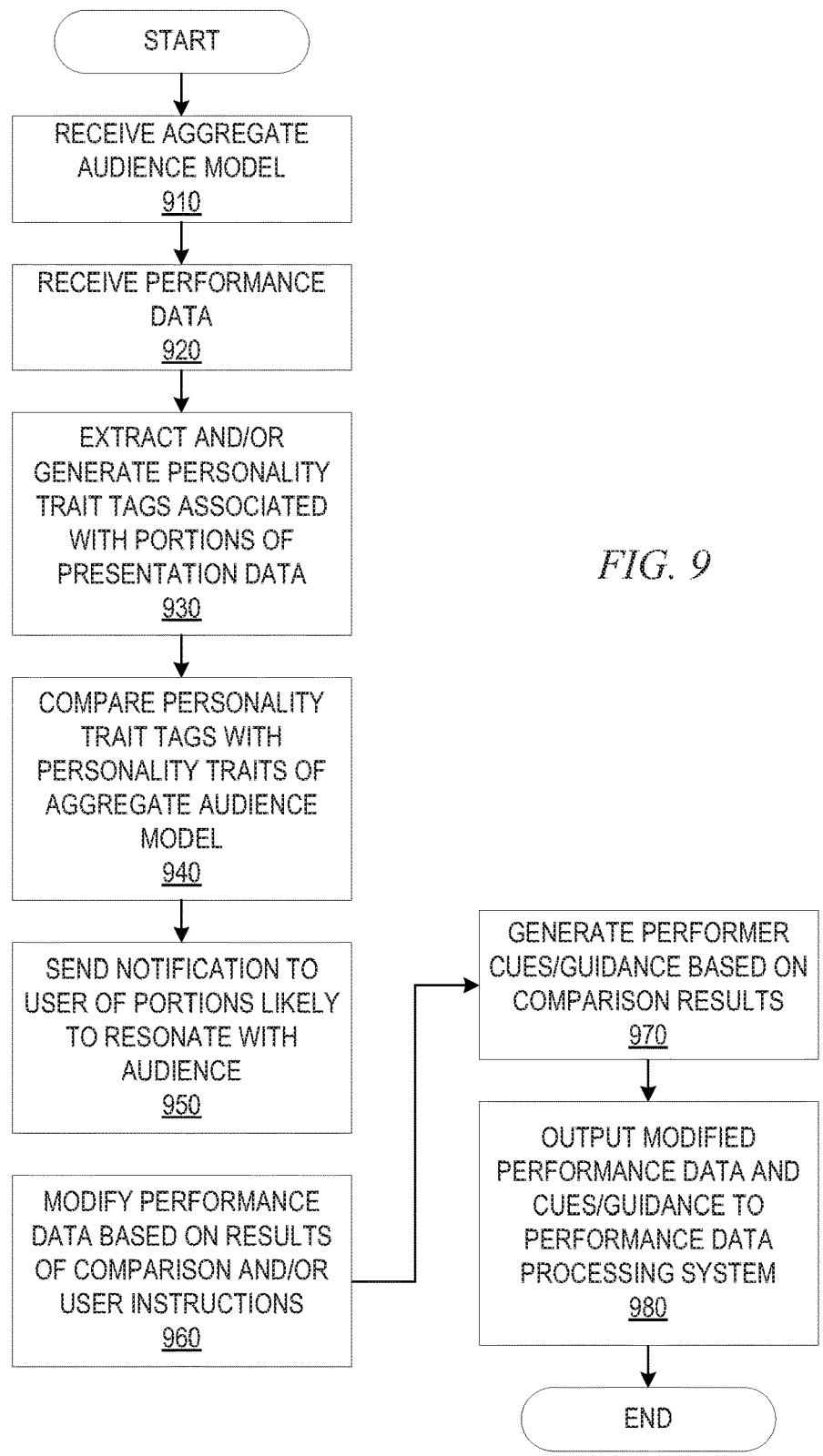
FIG. 9 is a flowchart outlining an example operation for performing pre-performance customization of a performance in accordance with one illustrative embodiment.

FIG. 9 is a flowchart outlining an example operation for performing pre-performance customization of a performance in accordance with one illustrative embodiment. As shown in FIG. 9, the operation starts by receiving the aggregate audience model (step 910) and the performance data (step 920) representing the performance that is to be modified. The personality trait tags, if any, in the performance data are extracted or personality trait tags are automatically generated and associated with portions of the presentation data (step 930). Personality trait tags extracted from the presentation data and/or associated with portions of the presentation data automatically are compared to the personality traits of the aggregate audience model (step 940).

A notification is sent to the user indicating the portions of the presentation data most likely to resonate with the audience represented by the aggregate audience model (step 950). The performance data is modified based on the results of the comparison and, optionally, instructions received from the user in response to the notification that is sent (step 960). Performance cues and guidance information may be generated based on the comparison results (step 970) and the resulting modified performance data and cues/guidance are output to a performance data processing system for use in presenting the performance (step 980). The operation then terminates.

Figure 10:
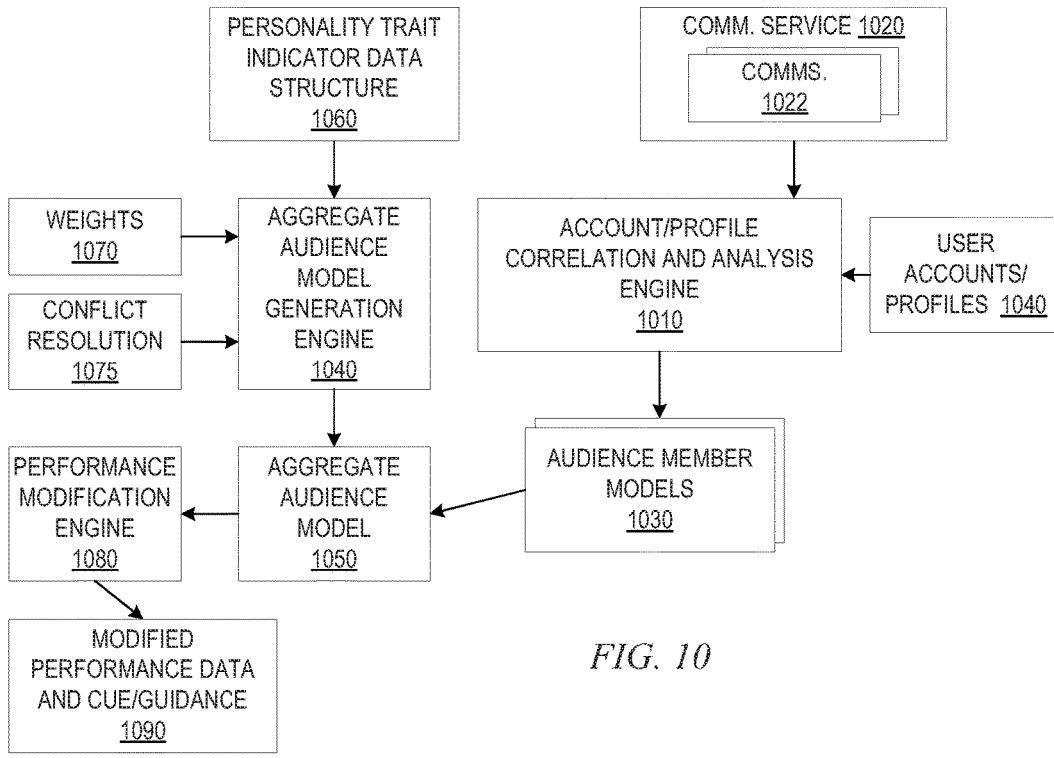
FIG. 10 is an example diagram illustrating a process for performing real-time dynamic modification of a performance based on an aggregate audience model in accordance with one illustrative embodiment.

V. Real-Time Dynamic Modification of Performance Based on Aggregate Audience Model FIG. 10 is an example diagram illustrating a process for performing real-time dynamic modification of a performance based on an aggregate audience model in accordance with one illustrative embodiment. While in some of the illustrative embodiments, the aggregate audience model is generated a priori based on an identification of the audience members via a registration or sign-up mechanism and correlation with other websites, social network and communication services, and the like as described above with regard to FIGS. 6 and 7, in other illustrative embodiments the aggregate audience model may also be generated and used dynamically while the performance is being performed. For example, as shown in FIG. 10, rather than having to utilize a registration or sign up mechanism to identify audience members, audience members may be automatically identified in response to the audience members sending communications 1022 through one or more communication channels of one or more communication services 1020, social networking websites, or the like, during the presentation of the performance.

For example, if audience members are sending instant messages about the performance via an instant messaging service 1020 or system, the identification of the audience members may be performed by capturing the instant messages 1022, correlating them with an account or profile 1040 of the audience member associated with the particular instant messaging service 1020, and then building the audience member models 1030 based on the identified audience member's characteristics in their associated account/profile 1040 in the manner previously described above. Thus, for example, if the instant messaging service is the Twitter® messaging service, then audience member Tweets about the performance may be captured and the corresponding audience member's Twitter profile may be identified and the characteristics specified in the profile may be analyzed to identify one or more personality traits associated with that audience member. As discussed above, the Tweets that are about the performance may be identified through the identification of specific hashtags, geolocation information, timestamp information, topic analysis, etc., or any combination of mechanisms for identifying communications that are specifically about the performance.

The audience member's personality traits in the audience member models 1030 of the subset of audience members exchanging message 1022 about the performance may be aggregated by the aggregate audience model generation engine 1040 to thereby generate an aggregate audience model 1050. The aggregate audience model generation engine 1040 may utilize the personality trait indicators data structure 1060, weights data structure 1070, and conflict resolution logic 1075 in the manner previously described above to generate the aggregate audience model 1050. The aggregate audience model 1050 may be input to the performance modification engine 1080 in the manner previously discussed above to generate an output of a modified performance and performer cues/guidance 1090.

Thus, in this illustrative embodiment, only a sub-set of the audience members may be used to generate the aggregate audience model 1050 representing the entirety of the audience, i.e. only those audience members that choose to exchange communications 1022 about the performance via one or more communication services 1020. This aggregate audience model 1050 may be continuously adjusted as more audience members exchange communications 1022. It should be appreciated that an aggregate audience model 1050 generation may be triggered only after a predetermined number of different audience members exchange communications 1022 about the performance so as to not cause the performance to be customized for a minority of the audience members or indicators output to the performer based on a minority of the audience members.

Thus, the mechanisms of the illustrative embodiments provide the functionality for identifying audience member personality traits and using these personality traits to generate an aggregate audience model that represents and aggregation of the personality traits of the audience members, i.e. models the entire audience as a single audience member having a particular set of personality traits. The aggregate audience model may be used to identify portions of a performance that are most likely to be of interest or resonate with the audience members. This identification may then be used to output an indication to a user of those portions of the performance that are most likely of interest or resonate with the audience members and/or automatically or semi-automatically modify the performance based on the identification of these portions.

FIG. 11 is a flowchart outlining an example operation for performing real-time dynamic modification of a performance based on an aggregate audience model in accordance with one illustrative embodiment. As shown in FIG. 11, the operation starts with the initiation of the presentation of the performance (step 1105). During the presentation of the performance, communications via a plurality of communication channels of one or more communication services are monitored to identify communications directed to the performance (step 1110). The identification of communications directed to the performance may be performed using identifiers in the content of the communications that are indicative of the performance. For example, in some illustrative embodiments, hashtags or other unique identifiers associated with the performance may be identified in the communications and used to correlation the communications with the performance, e.g., a presentation on cancer treatments may have the hashtag "#treatcancer" and communications by audience members may utilize this hashtag to identify what their communications are referring to.

The communications that are exchanged about the performance are identified and correlated with user accounts/profiles of the users that submitted the communications (step 1120). Audience member models are generated for the identified users based on the user accounts/profiles in the manner previously described above, i.e. correlating characteristics in the accounts/profiles with indicators of personality traits (step 1130). An aggregate audience model is generated based on the audience member models (step 1140). The performance data is then modified and/or presenter cues and guidance are generated and output based on the aggregate audience model (step 1150). The operation then terminates. While FIG. 11 shows the operation terminating, it should be appreciated that this operation may be continuous while the presentation of the performance is under way and may terminate in response to termination of the presentation of the performance. As such, the modification of the performance and/or generation of cues and guidance may be dynamic as more communications are exchanged by audience members and the aggregate audience model is updated.

VI. Natural Language Processing of Audience Messages to Identify Audience Feedback The above illustrative embodiments utilize an aggregate audience model to modify the performance data and/or generate performer/presenter cues and guidance based on the aggregate audience model, either prior to the presentation of the performance or dynamically during the presentation of the performance. In addition, as touched upon above, the illustrative embodiments may also analyze the content of the communications exchanged by audience members to identify communications providing feedback about the performance which can be used to modify the presentation of the performance.

Figure 12:
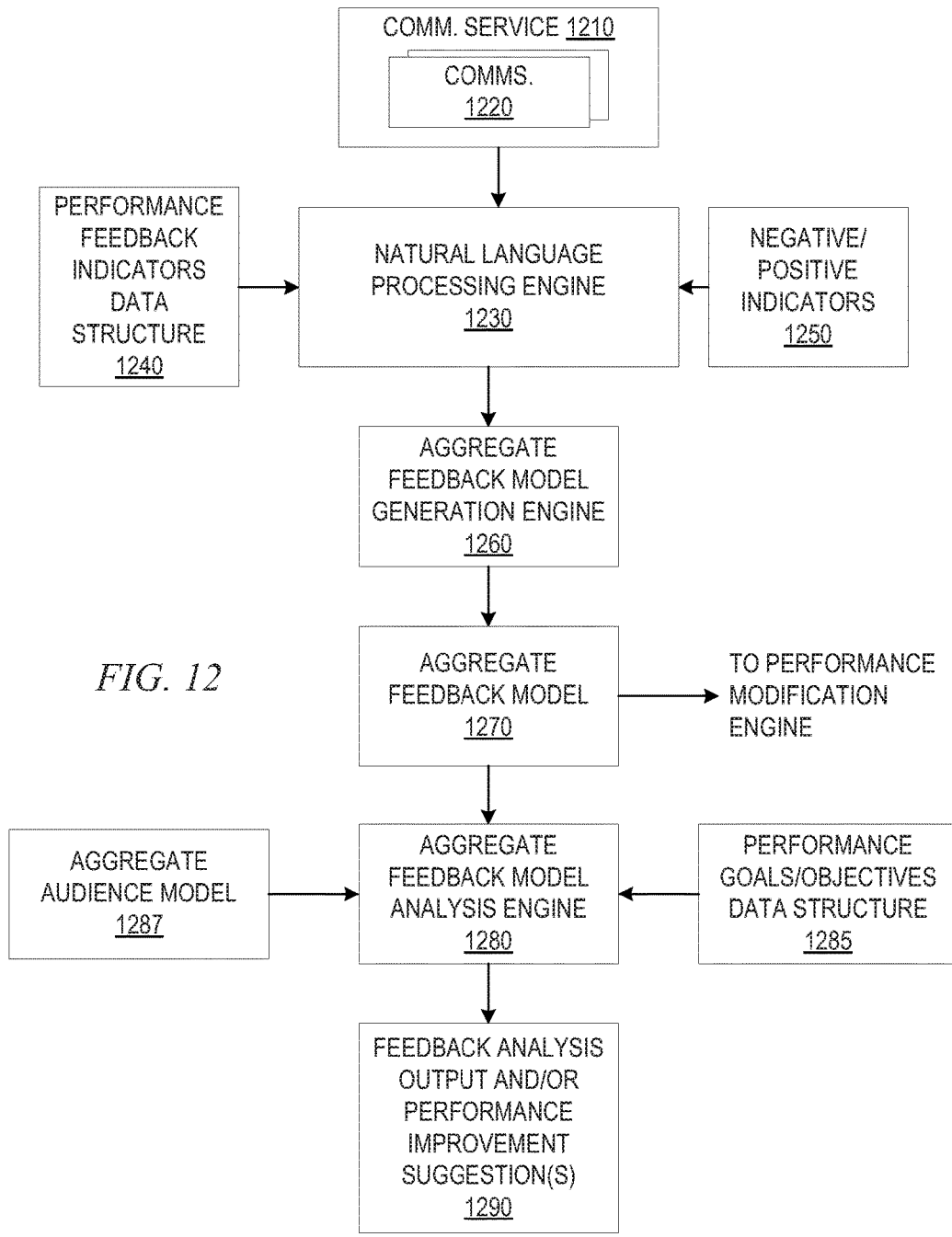
FIG. 12 is an example diagram illustrating a process for processing audience messages to determine audience feedback for a performance in accordance with one illustrative embodiment.

FIG. 12 is an example diagram illustrating a process for processing audience messages to determine audience feedback for a performance in accordance with one illustrative embodiment. The process outlined in FIG. 12 may be implemented, for example, by logic of the aggregate feedback model generation engine 330 in FIG. 3, for example. The logic of the aggregate feedback model generation engine 330 may be implemented as software executed on hardware resources, dedicated hardware logic, or a combination of software executed on hardware resources and dedicated hardware logic.

As shown in FIG. 12, natural language statements provided by the audience members via their communications 1220, e.g., instant messages, website posts, or the like, via one or more communications services 1210 may be analyzed using NLP mechanisms 1230 to identify terms/phrases that are recognizable as indicative of feedback on a performance both positive and negative. The terms/phrases that are recognized by the NLP mechanisms 1230 may be evaluated to determine if they are associated with other terms/phrases indicative of positive or negative context. Entries in an aggregate feedback model data structure 1270 may then be added or counts of corresponding already existing entries may be updated to indicate the number of audience members providing the various feedback information. Thus, for example, a first audience member may tweet the message "Too much use of hands" and another audience member may tweet the message "I wish he would not use his hands so much" as communications 1220 using a Twitter® communication service 1210. Both of these messages 1220 may be analyzed using the NLP mechanisms 1230 based on the performance feedback indicators data structure 1240 that identifies the terms/phrases and the like that are recognizable as being representative of feedback on a performance. In this example, terms such as "hands" and "use" may be indicative of feedback and thus, it would be determined that both communications 1220 deal with the presenter's use of hands. Moreover, the NLP mechanisms 1230 may also utilize negative/positive indicator data structure 1250 to identify terms indicative of negative and positive contexts of the feedback terms/phrases, such as "too much", "not enough", "more", "I like", and the like. In the present example, it would be determined that both communications 1220 have negative context indicating that the presenter is using their hands too much while speaking.

The feedback information from multiple audience members, via their communications 1220, may be aggregated by the aggregate feedback model generation engine 1260 to obtain an aggregate feedback model 1270. The aggregation may comprise an aggregation operation similar to that of the personality traits of the audience members discussed above. Thus, once a certain predetermined number of audience members indicate a similar feedback in their communications 1220, then the aggregate feedback model 1270 may indicate this feedback as well. The aggregate feedback model 1270 represents a consensus of audience member feedback as to where the performance may be improved.

The aggregate feedback model 1270 may be used to generate output messages, cues, highlighting, or the like, to the performer so as to give the performer feedback as to ways to improve the performance such that the performance will resonate more, or be of more interest to, the audience. For example, terms/phrases that indicate areas of interest of the audience may be identified, via NLP mechanisms 1230, in communications 1220 sent by the audience members, places where the audience would like more detailed information, and the like. In some instances, the aggregate feedback model 1270 may inform the performer of things that are distracting to the audience, such as hand motions used by the performer, use of distracting terms or phrases such as "ummm" or "you know," the performer speaking too much or not loud enough, the audio equipment not working well on the left side of the auditorium, or the like.

Thus, the aggregate feedback model 1270 may be used by the performance modification engine 340 to modify the performance data for the performance and/or generate cues and guidance messages, indicators, highlighting, and the like, to be output to the performer(s). In the above example, a message may be output to the performer via their computing device, a teleprompter, or the like, of the type "Too much use of hands." Other feedback such as "talk more about last year's sales" or "speak louder" or "stop moving about" or the like may also be output based on feedback obtain from communications exchanged by audience members. Moreover, in some cases, portions of the presentation data may be highlighted or accentuated in one manner or another based on the feedback, e.g., if the feedback is that the audience would like to hear more about last year's sales, then a slide directed to last year's sales may be highlighted in a listing of slides, presenter notes directed to last year's sales may be highlighted, and/or the like.

As discussed above, in some illustrative embodiments, an agenda goals or objectives data structure 1285 may be associated with the performance data, e.g., goals/objectives data structure 834 associated with performance data 830 in FIG. 8, that specifies certain types of audience feedback that a presenter, creator, or other individual associated with the performance wishes to elicit from the audience. For example, a presenter may wish to elicit feedback indicative of the audience finding the presentation to be useful, the presentation to be well presented, or the like. These agenda goals or objectives may be evaluated by an aggregate feedback model analysis engine 1280 against the aggregate feedback model 1270 to determine where feedback represented in the aggregate feedback model 1270 indicates that the goals/objectives specified in the performance goals/objectives data structure 1285 have or have not been met. The identification of goals/objectives that have and have not been met may be correlated with the personality traits of the audience as specified in the aggregate audience model 1287 to provide further insight into why or why not the goals/objectives were or were not met by the performance. As a result, the performer may be provided with an output of feedback analysis 1290 after the performance to indicate whether the performer should place much credibility in the feedback received in the aggregate feedback model 1270 or not, and where the performer may be able to improve their performance in the future for a similar type of audience, as specified by the personality traits in the aggregate audience model 1287.

In other words, in operation, the illustrative embodiments may further provide an aggregate feedback model analysis engine 1280 which takes as input the aggregate feedback model 1270, the aggregate audience model 1287, and the performance goals/objectives data structure 1285 associated with the performance data, and evaluates whether the aggregate feedback model 1270 includes feedback information that corresponds to performance goals/objectives specified for the performance in the performance goals/objectives data structure 1285. For example, terms/phrase matching, taking into account synonyms, antonyms, and other related terms/phrases and terminology, may be performed using natural language processing mechanisms of the aggregate feedback model analysis engine 1280, to correlate feedback with goals/objectives, e.g., feedback indicating that the performance was boring may be correlated with a goal of the audience finding the performance of interest or feedback indicating that the performance was informational may be correlated with goals of the performance being useful.

If one or more of the feedback elements in the aggregate feedback model 1270 correlates to a goal or objective set forth in the performance goals/objectives data structure 1285, then the aggregate feedback model analysis engine 1280 may further analyze the aggregate audience model 1287 to determine the underlying reasoning as to why the feedback may have been provided by the particular audience based on the aggregate audience personality traits. That is, a correlation between the type of feedback, its positive/negative nature, the personality traits of the audience, and the alignment of the personality traits of the audience with the performance goals/objectives, may be generated by the aggregate feedback model analysis engine 1280 to determine an underlying reasoning for the particular feedback.

For example, if the feedback element in the aggregate feedback model 1270 indicates that the audience found the performance to be too detailed, and the aggregate personality trait of the audience specified in the aggregate audience model 1287 is of a "big picture" or "extrovert" nature, then it may be determined that the reason for the feedback being negative in this regard is not necessarily because the performance itself was poorly performed, but rather that the performance was not in line with the level and type of information that the audience resonates with. A corresponding output 1290 may be generated to the performer that the performance could be improved for this particular type of audience if less detailed information is presented and a more general overview or high level inter-relationship type performance is provided, as discussed previously. In other instances, it may be determined that certain negative type personality traits may be the cause of the negative feedback and thus, the performer can be assured that the feedback is of less importance.

In other instances, the feedback may be of a more universal nature in that the feedback is not necessarily attributable to a particular personality trait of the aggregate audience model 1287 but is in fact independent of personality traits and yet may affect one or more of the performance goals/objectives. For example, for goals of the performance being "clear" or "useful", audience feedback indicating that the performer used his/her hands too much and it was distracting may be correlated with the goal of being "clear" and "useful" in that anything distracting will reduce clearness and usefulness of the content of the performance. Thus, an output 1290 of the type "The audience found that you used your hands too much and it was distracting. Try to refrain from using your hands as much while performing in order to make your performance more clear and useful." In this way, the feedback is correlated with a suggestion for improvement and the weighting of the feedback is implied in that there is no statement that reduces the impact of the feedback.

Thus, the illustrative embodiments, through analysis of the aggregate feedback model 1270, the performance goals/objectives 1285, and the aggregate audience model 1287, can provide feedback outputs 1290 to the performer to inform the performer of the underlying reasons for the feedback, determine a relative weight the performer should give the feedback based on the alignment of the feedback and the audience personality traits, and provide suggestions for improving the performance. Moreover, the feedback output may incorporate the personality traits of the aggregate audience and information about how these personality traits align with the goals/objectives of the performance in order to determine the weighting the performer should give to the feedback, e.g., seriously consider the feedback, disregard the feedback, or the like.

FIG. 13 is a flowchart outlining an example operation for analyzing audience messages to determine audience feedback in accordance with one illustrative embodiment. As shown in FIG. 13, the operation starts with the initiation of the presentation of the performance (step 1305). During the presentation of the performance, communications via a plurality of communication channels of one or more communication services are monitored to identify communications directed to the performance (step 1310). Again, the identification of communications directed to the performance may be performed using identifiers in the content of the communications that are indicative of the performance. As discussed above, in some illustrative embodiments, hashtags or other unique identifiers associated with the performance may be identified in the communications and used to correlation the communications with the performance.

Natural language processing is performed on the communications directed to the performance to identify feedback information in these communications as well as negative/positive context identifiers (step 1320). The identified feedback and negative/positive context are used to generate or update entries in a n aggregate feedback model to represent the feedback from the subset of audience members providing such feedback via their communications (step 1330). The aggregate feedback model is then used to modify the performance data and/or generate cues/guidance for the performer (step 1340). The modified performance data and/or cues/guidance are then output to the performer(s) via their computing devices, teleprompters, or other output interface (step 1350). The operation then terminates. While FIG. 13 shows the operation terminating, it should be appreciated that this operation may be continuous while the presentation of the performance is under way and may terminate in response to termination of the presentation of the performance. As such, the modification of the performance and/or generation of cues and guidance may be dynamic as more communications are exchanged by audience members and the aggregate feedback model is updated.

It should be noted that while the above illustrative embodiments are primarily directed to the output of modified performance data and cues/guidance to performers, the illustrative embodiments are not limited to such. Rather, in other illustrative embodiments, the controller 310 in FIG. 3 may comprise logic for controlling equipment used during the performance so as to modify the operation of this equipment based on the aggregate audience model and/or aggregate feedback model. Thus, for example, if the audience members indicate that they cannot hear the speaker, the controller 310, via the interface 320, may send control signals or instructions to audio equipment to increase the volume of the output of the audio equipment. Alternatively, a message may be output to the speaker or other individual involved in the performance to inform them of a need to modify the equipment's operation so as to facilitate a better experience for the audience. Other equipment may be controlled based on aggregate audience feedback and aggregate audience personality traits without departing from the spirit and scope of the illustrative embodiments.

Thus, the mechanisms of the illustrative embodiments may be used to modify a performance both a priori and during a performance and/or output cues, messages, of other feedback to the performer(s) to guide them as to where improvement of the performance may be made for the particular audience. This modification and feedback may be performed based on aggregate models of the audience personality traits and/or audience feedback communications exchanged during the performance. Natural language processing mechanisms may be used to identify personality traits and feedback from communications exchanged by the audience members.

As discussed above, while the above illustrative embodiments are described in terms of performances and the ability of the illustrative embodiments to modify such performances and/or provide performer cues and feedback, the illustrative embodiments may be applied to any operations that may be based on an aggregate user model that comprises an aggregate of personality traits for a group of users. Thus, any cognitive operation that may be performed by a cognitive system based on an aggregate user model may utilize the mechanisms of the illustrative embodiments to generate the aggregate user model.

In applying the mechanisms of the illustrative embodiments to the general application of an aggregate user model, a set of individuals may be identified by identifying a collection of communications exchanged within a predetermined time frame within a particular group or associated with a particular communication system. For example, a forum group may be established on a website and communications exchanged within the forum group within a specified time frame may be monitored to identify a set of users that have exchanged communications within the time frame. As another example, a group of users that have exchanged communications about a particular topic, event, or the like, as may be identified by the indicators previously mentioned above, e.g., hashtags, key terms/phrases, etc., within the specified time frame via a social networking website may be identified as the set of individuals.

For the set of individuals, their associated user models may be generated in the manner previously discussed above to associate particular personality traits and scores associated with these personality traits with the particular individual. These personality traits and scores may be aggregated as discussed above to generate an aggregate user model. The aggregate user model may be output to a cognitive operation system that performs a cognitive operation based on the aggregate user model.

For example, given a suggestion for a solution to a problem, or a suggestion as to an action or event to be engaged in, or the like, that has been made by several people via a social networking website, an aggregate user model is generated by the mechanisms of the illustrative embodiments. As part of a cognitive operation performed based on this aggregate user model, a single user may have a generated user model specific to that user which may then be matched with similar personality traits within a particular range of the aggregate user model. That is, the major personality traits of the user model may be matched to the aggregate user model by determining whether the scores associated with the personality traits of the user model are within a predetermined range of the score of the corresponding personality trait in the aggregate user model. If so, then a match is determined to exist and the cognitive operation may then send the same suggestion to the user.

As a further example, in a question and answering (QA) pipeline of a cognitive system, an aggregate user model may be used to score candidate answers that originated from evidence that were attributed to these several users when the aggregate and the requestor user models match within a range. This may include, for example, scoring higher the candidate answers that match the most dominant personality traits from the requestor. For example, if a user asks a question, "What is the best place for Sushi?," the user may have dominant personality traits for openness and extraversion. Each candidate answer has evidence based on data provided or attributed to a set of users, wherein the answers are (1) "Sushi Exa because of the decor", (2) "Sushi Beta is one of the best they have a new type and social environment". etc. The users that are attributed to those answers have an aggregate user model associated with them for this scoring and ultimate choice of the final answer returned to the user. For example, answer (2) may be returned based on more users with dominant extraversion traits and openness to try new things.

As another example, in a social media setting where multiple audience individuals are posting messages and a person is presenting several topics that the audience is commenting on, the illustrative embodiments may filter a set of individual posts into a time frame that matches the topic based on when the user began talking about the topic and stopped talking about the topic. The time frame and context may be used to filter comments and users that participated during that time, to have a more accurate representation of an aggregate user model in a social evolving presentation. Further, a message resonance score can be used to determine the beginning of high resonance messages by both the presenter and the audience based on the messages being sent, and when the resonance drops, those messages are the ones used to determine an aggregate user model, or the set of individuals to be used to generate an aggregate user model.

These are but example embodiments of cognitive operations that may be performed using the mechanisms of the illustrative embodiments. Other types of cognitive operations may be performed as will be readily apparent to those of ordinary skill in the art in view of the present description. Thus, any operation that may be based on the generation of an aggregate user model and/or aggregate feedback model as discussed above is intended to be within the spirit and scope of the present invention.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

It should further be noted that, as mentioned above, the mechanisms of the illustrative embodiments may be integrated in or augment the logic and functionality of a cognitive system, such as the IBM Watson™ cognitive system, which may provide the user model service for determining audience member personality traits. As such, in one aspect of the illustrative embodiments, the natural language processing, evaluation of audience member profiles, scoring of personality traits, evaluation of messages submitted by audience members, evaluation of the feedback from the audience members, and the like, may make use of logic within a cognitive system which may then be extended to implement the additional functions described herein. For example, a Question and Answer (QA) pipeline of a cognitive system may comprise natural language processing mechanisms for analyzing a corpus of information to extract features of interest in answering questions. This logic may be leveraged to perform analysis on audience member profiles, messages, and the like, to extract features indicative of personality traits. Moreover, the scoring mechanism of the QA pipeline may be utilized to generate confidence scores, for representing the confidence that an audience member has a particular personality trait, through evaluation of supporting evidence in the corpus of information, which may again comprise the audience member's profile(s), communications authored by the audience member, and the like. Thus, in some illustrative embodiments, a cognitive system is provided that performs various ones, and combinations of, the logic and functionality described above.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

Appendix A

[0025]  Example of a Personality trait tree:

```
{
  children:
  [
    {
      children:
      [
        {
          percentage: 0.99,
          category: "personality",
          children:
          [
            {
```

```
        percentage: 0.99,
        category: "personality",
        children:
        [],
        name: "Openness",
        id: "Openness",
    },
    {
        percentage: 0.85,
        category: "personality",
        children:
        [
            {
                percentage: 0.69,
                category: "personality",
                name: "Achievement striving",
                id: "Achievement striving",
            },
            {
                percentage: 0.96,
                category: "personality",
                name: "Cautiousness",
                id: "Cautiousness",
            },
            {
                percentage: 0.09,
                category: "personality",
                name: "Dutifulness",
                id: "Dutifulness",
```

```
            },
            {
                percentage: 0.02,
                category: "personality",
                name: "Orderliness",
                id: "Orderliness",
            },
            {
                percentage: 0.68,
                category: "personality",
                name: "Self-discipline",
                id: "Self-discipline",
            },
            {
                percentage: 0.76,
                category: "personality",
                name: "Self-efficacy",
                id: "Self-efficacy",
            }
        ],
        name: "Conscientiousness",
        id: "Conscientiousness",
    },
    {},
    {
        percentage: 0.04,
        category: "personality",
``` children:
[
    {
        percentage: 0.06,
        category: "personality",
        name: "Altruism",
        id: "Altruism",
    },
    {
        percentage: 0.34,
        category: "personality",
        name: "Cooperation",
        id: "Cooperation",
    },
    {
        percentage: 0.02,
        category: "personality",
        name: "Modesty",
        id: "Modesty",
    },
    {
        percentage: 0.04,
        category: "personality",
        name: "Morality",
        id: "Morality",
    },
    {
        percentage: 0.68,
        category: "personality",
        name: "Sympathy",
        id: "Sympathy",

```
        },
        {
            percentage: 0.07,
            category: "personality",
            name: "Trust",
            id: "Trust",
        }
    ],
    name: "Agreeableness",
    id: "Agreeableness",
},
{
percentage: 0.12,
category: "personality",
children:
[
        {
            percentage: 0.1,
            category: "personality",
            name: "Anger",
            id: "Anger",
        },
        {
            percentage: 0.05,
            category: "personality",
            name: "Anxiety",
            id: "Anxiety",
        },
        {
            percentage: 0.24,
            category: "personality",
```

```
                name: "Depression",
                id: "Depression",
            },
            {
                percentage: 0.12,
                category: "personality",
                name: "Immoderation",
                id: "Immoderation",
            },
            {
                percentage: 0.06,
                category: "personality",
                name: "Self-consciousness",
                id: "Self-consciousness",
            },
            {
                percentage: 0.01,
                category: "personality",
                name: "Vulnerability",
                id: "Vulnerability",
            }
        ],
        name: "Neuroticism",
        id: "Neuroticism".
        }
    ],
    name: "Openness",
    id: "Openness_parent"
}
```

```
],
name: "Big 5",
id: "personality"
},
{
children:
[
    {
        percentage: 0.94,
        category: "needs",
        children:
        [
            {
                percentage: 0.18,
                category: "needs",
                name: "Challenge",
                id: "Challenge",
            },
            {
                percentage: 0.69,
                category: "needs",
                name: "Closeness",
                id: "Closeness",
            },
            {
                percentage: 0.51,
                category: "needs",
                name: "Curiosity",
                id: "Curiosity",
            },
            {
```

```
    percentage: 0.94,
    category: "needs",
    name: "Excitement",
    id: "Excitement",
},
{
    percentage: 0.65,
    category: "needs",
    name: "Harmony",
    id: "Harmony",
},
{
    percentage: 0.67,
    category: "needs",
    name: "Ideal",
    id: "Ideal",
},
{
    percentage: 0.47,
    category: "needs",
    name: "Liberty",
    id: "Liberty",
},
{
    percentage: 0.17,
    category: "needs",
    name: "Love",
    id: "Love",
},
{
```

```
            percentage: 0.86,
            category: "needs",
            name: "Practicality",
            id: "Practicality",
          },
          {
            percentage: 0.47,
            category: "needs",
            name: "Self-expression",
            id: "Self-expression",
          },
          {
            percentage: 0.67,
            category: "needs",
            name: "Stability",
            id: "Stability",
          },
          {
            percentage: 0.44,
            category: "needs",
            name: "Structure",
            id: "Structure",
          }
        ],
        name: "Excitement",
        id: "Excitement_parent"
      }
    ],
    name: "Needs",
    id: "needs"
  },
```

```
{
    children:
    [
        {
            percentage: 0.04,
            category: "values",
            children:
            [
                {
                    percentage: 0.41,
                    category: "values",
                    name: "Conservation",
                    id: "Conservation",
                },
                {
                    percentage: 0.74,
                    category: "values",
                    name: "Openness to change",
                    id: "Openness to change",
                },
                {
                    percentage: 0.45,
                    category: "values",
                    name: "Hedonism",
                    id: "Hedonism",
                },
                {
                    percentage: 0.71,
                    category: "values",
                    name: "Self-enhancement",
                    id: "Self-enhancement",
```

```
            },
            {
                    percentage: 0.04,
                    category: "values",
                    name: "Self-transcendence",
                    id: "Self-transcendence",
            }
        ],
        name: "Self-transcendence",
        id: "Self-transcendence_parent"
      }
   ],
   name: "Values",
   id: "values"
}
```

What is claimed is:

1. A method, in a natural language processing (NLP) system comprising a processor and a memory, the method comprising:
receiving, by the NLP system, a plurality of communications associated with a communication system, over a predetermined time period, from a plurality of end user devices;
identifying, by the NLP system, for each communication in the plurality of communications, a user submitting the communication to thereby generate a set of users comprising a plurality of users associated with the plurality of communications;
retrieving, by the NLP system, a user model for each user in the set of users, wherein the user model specifies at least one personality trait of a corresponding user;
generating, by the NLP system, an aggregate user model that aggregates the at least one personality trait of each user in the set of users together to generate an aggregate representation of the personality traits of the plurality of users in the set of users; and
performing, by the NLP system, a cognitive operation based on the aggregate use model.

2. The method of claim 1, wherein retrieving the user model for each user in the set of users comprises:
determining the at least one personality trait associated with the user based on indicators in natural language of one or more communications, in the plurality of communications, associated with the user as identified by natural language processing performed on the one or more communications.

3. The method of claim 1, wherein the at least one personality trait of the user is identified based on at least one of information specified in a stored profile of the user and wherein the stored profile of the user is a user profile stored in association with a social networking website system through which the plurality of communications are received by the NLP system.

4. The method of claim 1, wherein generating the aggregate user model comprises at least one of combining a like personality trait, of the set of users, that are within a standard deviation of a variance of the like personality trait, or combining personality traits, of the set of users, that are within a fixed range for a majority of the users in the set of users.

5. The method of claim 1, wherein generating the aggregate user model comprises weighting each personality trait of each user in the set of users using a mean square weighted deviation.

6. The method of claim 1, wherein generating the aggregate user model comprises:
correlating personality trait values, for each personality trait specified in the user models of the set of users, to identify correlated personality trait values from among the user models;
eliminating non-correlating personality trait values that are more than one standard deviation away from other similar personality trait values; and
summing, for each personality trait specified in the user models, the correlated personality trait values to generate an aggregate score for each personality trait.

7. The method of claim 6, wherein correlating personality trait values comprises:
calculating a standard deviation for all personality trait values specified in the user models for a selected personality trait;
generating a plurality of brackets of personality trait values for the personality trait, wherein each bracket in the plurality of brackets represents a separate and distinct range of personality trait values from the other brackets in the plurality of brackets; and
associating each personality trait value in the personality trait values specified in the user models with one of the brackets in the plurality of brackets.

8. The method of claim 7, wherein generating the aggregate user model father comprises:
for each bracket in the plurality of brackets, counting a number of personality trait values falling within the bracket to generate a bracket count; and
selecting at least one bracket of the plurality of brackets having a largest bracket count.

9. The method of claim 7, wherein; generating the aggregate user model further comprises:
for each bracket in the plurality of brackets, counting a number of personality trait values falling within the bracket to generate a bracket count;
selecting two brackets from the plurality of brackets based on the bracket counts of the plurality of brackets;
determining if the selected brackets have ranges of personality trait values that are adjacent to each other; and
in response to the selected brackets having ranges of personality trait values that are adjacent to each other, selecting the personality trait values that are within the selected brackets and eliminating the lowest and highest personality trait values that are one standard deviation away from high and low personality trait values of the selected brackets.

10. The method of claim 1, wherein the plurality of communications are communications directed to a same topic exchanged by the set of users within the predetermined time period.

11. The method of claim 1, wherein the cognitive operation comprises at least one of forwarding a suggestion specified in one or more of the communications in the plurality of communications to another user based on a matching of a user model of the other user being associated with the aggregate user model, scoring a candidate answer to a question based on a correlation of the user model of the other user being associated with the aggregate user model, or filtering messages exchanged a ng the predetermined time period.

12. A computer program product comprising a non-transitory computer readable storage medium having a computer readable program stored therein, wherein the computer readable program, when executed On a computing device implementing a natural language processing (NLP) system, causes the computing device to:
receive, by the NLP system, a plurality of communications associated with a communication system, over a predetermined time period, from a plurality of end user devices;
identify, by the NLP system, for each communication in the plurality of communications, a user submitting the communication to thereby generate a set of users comprising a plurality of users associated with the plurality of communications;
retrieve, by the NLP system, a user model for each user in the set of users, wherein the user model specifies at least one personality trait of a corresponding user;
generate, by the NLP system, an aggregate user model that aggregates the at least one personality trait of each user in the set of users together to generate an aggregate representation of the personality traits of the plurality of users in the set of users; and perform, by the NLP system, a cognitive operation based on the aggregate user model.

13. The computer program product of claim 12, wherein the computer readable program further causes the computing device to retrieve the user model for each user in the set of users at least by:

determining the at least one personality trait associated with the user based on indicators in natural language of one or more communications, in the plurality of communications, associated with the user as identified by natural language processing performed on the one or more communications.

14. The computer program product of claim 12, wherein the at least one personality, trait of the user is identified based on at least one of information specified in a stored profile of the user and wherein the stored profile of the user is a user profile stored in association with a social networking website system through which the plurality of communications are received by the NLP system.

15. The computer program product of claim 12, wherein the computer readable program further causes the computing device to generate the aggregate user model at least by at least one of combining a like personality trait, of the set of users, that are within a standard deviation of a variance of the like personality trait, or combining personality traits, of the set of users, that are within a fixed range for a majority of the users in the set of users.

16. The computer program product of claim 12, wherein the computer readable program further causes the computing device to generate the aggregate user model at least by weighting each personality trait of each user in the set of users using a mean square weighted deviation.

17. The computer program product of claim 12, wherein the computer readable program further causes the computing device to generate the aggregate user model at least by:

correlating personality trait values, for each personality trait specified in the user models of the set of users, to identify correlated personality trait values from among the user models;

personality trait values that are more than one standard deviation away from other similar personality trait values; and summing, for each personality trait specified in the user models, the correlated personality trait values to generate an aggregate score for each personality trait.

18. The computer program product of claim 17, wherein correlating personality trait values comprises:

calculating a standard deviation for all personality trait values specified in the user models for a selected personality trait;

generating a plurality of brackets of personality trait values for the personality trait, wherein each bracket in the plurality of brackets represents a separate and distinct range of personality trait values from the other brackets in the plurality of brackets; and associating each personality trait value in the personality trait values specified in the user models with one of the brackets in the plurality of brackets.

19. The computer program product of claim 18, wherein the computer readable program further causes the computing device to generate the aggregate user model at least by:

for each bracket in the plurality of brackets, counting a number of personality trait values falling within the bracket to generate a bracket count; and selecting at least one bracket of the plurality of brackets having a largest bracket count.

20. The computer program product of claim 18, wherein the computer readable program further causes the computing device to generate the aggregate user model at least by:

for each bracket in the plurality of brackets, counting a number of personality trait values falling within the bracket to generate a bracket count;

selecting two brackets from the plurality of brackets based on the bracket counts of the plurality of brackets;

determining if the selected brackets have ranges of personality trait values that are adjacent to each other; and in response to the selected brackets having ranges of personality trait values that are adjacent to each other, selecting the personality trait values that are within the selected brackets and eliminating the lowest and highest personality trait values that are one standard deviation away from high and low personality trait values of the selected brackets.

21. The computer program product of claim 12, wherein the plurality of communications are communications directed to a same topic exchanged by the set of users within the predetermined time period.

22. The computer program product of claim 12, wherein the cognitive operation comprises at least one of forwarding a suggestion specifies in one or more of the communications in the plurality of communications to another user based on a matching of a user model of the other user being associated with the aggregate user model, scoring a candidate answer to a question based on a correlation of the user model of the other user being associated with the aggregate user model, or filtering messages exchanged during the predetermined time period.

23. An apparatus comprising:

a processor; and a memory coupled to the processor, wherein the memory comprises instructions which, when executed by the processor, cause the processor to:

receive a plurality of communications associated with a communication system, over a predetermined time period, from a plurality of end user devices;

identify for each communication in the plurality of communications, a user submitting the communication to thereby generate a set of users comprising a plurality of users associated with the plurality of communications;

retrieve a user model for each user in the set of users, wherein the user model specifies at least one personality trait of a corresponding user;

generate an aggregate user model that aggregates the at least one personality trait of each user in the set of users together to generate an aggregate representation of the personality traits of the plurality of users in the set of users; and perform a cognitive operation based on the aggregate user model.

* * * * *